US006509436B1

(12) United States Patent
Cahill et al.

(10) Patent No.: US 6,509,436 B1
(45) Date of Patent: *Jan. 21, 2003

(54) OXYGEN SCAVENGING CONDENSATION COPOLYMERS FOR BOTTLES AND PACKAGING ARTICLES

(75) Inventors: Paul J. Cahill, Wheaton, IL (US); Stephen Y. Chen, Wheaton, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/606,459

(22) Filed: Jun. 29, 2000

Related U.S. Application Data

(63) Continuation of application No. 08/717,370, filed on Sep. 23, 1996, now Pat. No. 6,083,585.

(51) Int. Cl.[7] .............................................. C08G 63/78
(52) U.S. Cl. ..................................... 528/277; 525/326.1
(58) Field of Search ...................... 428/35; 525/326.1; 528/277

(56) References Cited

U.S. PATENT DOCUMENTS

| 4,555,566 | A | * | 11/1985 | Arita | 528/323 |
| 4,960,642 | A | * | 10/1990 | Kosuga | 428/407 |
| 4,996,243 | A | * | 2/1991 | Rasmussen | 522/99 |
| 5,688,598 | A | * | 11/1997 | Keck | 428/458 |
| 5,792,812 | A | * | 8/1998 | Fujiki | 525/105 |
| 5,849,846 | A | * | 12/1998 | Chen | 525/166 |

* cited by examiner

Primary Examiner—Edward J. Cain
(74) Attorney, Agent, or Firm—Jennifer M. Hall; Joseph DiSalvo

(57) ABSTRACT

Compositions for scavenging oxygen are disclosed. These compositions comprise condensation copolymers comprising predominantly polyester segments and an oxygen scavenging amount of polyolefin oligomer segments. The polyester segments comprise segments derived from typical bottling and packaging polyesters such as PET and PEN. The copolymers are preferably formed by transesterification during reactive extrusion and typically comprise about 0.5 to about 12 wt % of polyolefin oligomer segments. The copolycondensates are capable of absorbing at least 0.4 cc of oxygen per gram of copolymer in the solid state at ambient temperatures and are typically used as layers in films, liners, cups, wraps, bottles, etc. Use of these oxygen scavenging compositions in bottles provides a clear and rigid bottle similar in appearance to unmodified polyester bottles. In a series of preferred embodiments, bottles fabricated with the oxygen scavenging copolycondensates of this invention are over 99.4 wt % polyester and suitable for recycle with other polyester bottles.

39 Claims, 10 Drawing Sheets

PREFERRED BOTTLE WALL AND FILM CONSTRUCTION CROSS SECTION

FILM CROSS SECTION OF COPOLYMER OF EXAMPLE 5
(STAINED WITH $OsO_4$)
96 WT % PET - 4 WT % PBD (MW 1230)

TRANSMISSION ELECTRON MICROSCOPE
PHOTOMICROGRAPH (x60,000)

PBD SEGMENT DIAMETER SIZE DISTRIBUTIONS
FROM TRANSMISSION ELECTRON MICROSCOPE DATA

ABSOLUTE TRANSPARENCY/CLARITY OF OF BIAXIALLY ORIENTED AND UNORIENTED COPOLYCONDENSATE FILMS 96 WT % PET - 4 WT % PBD

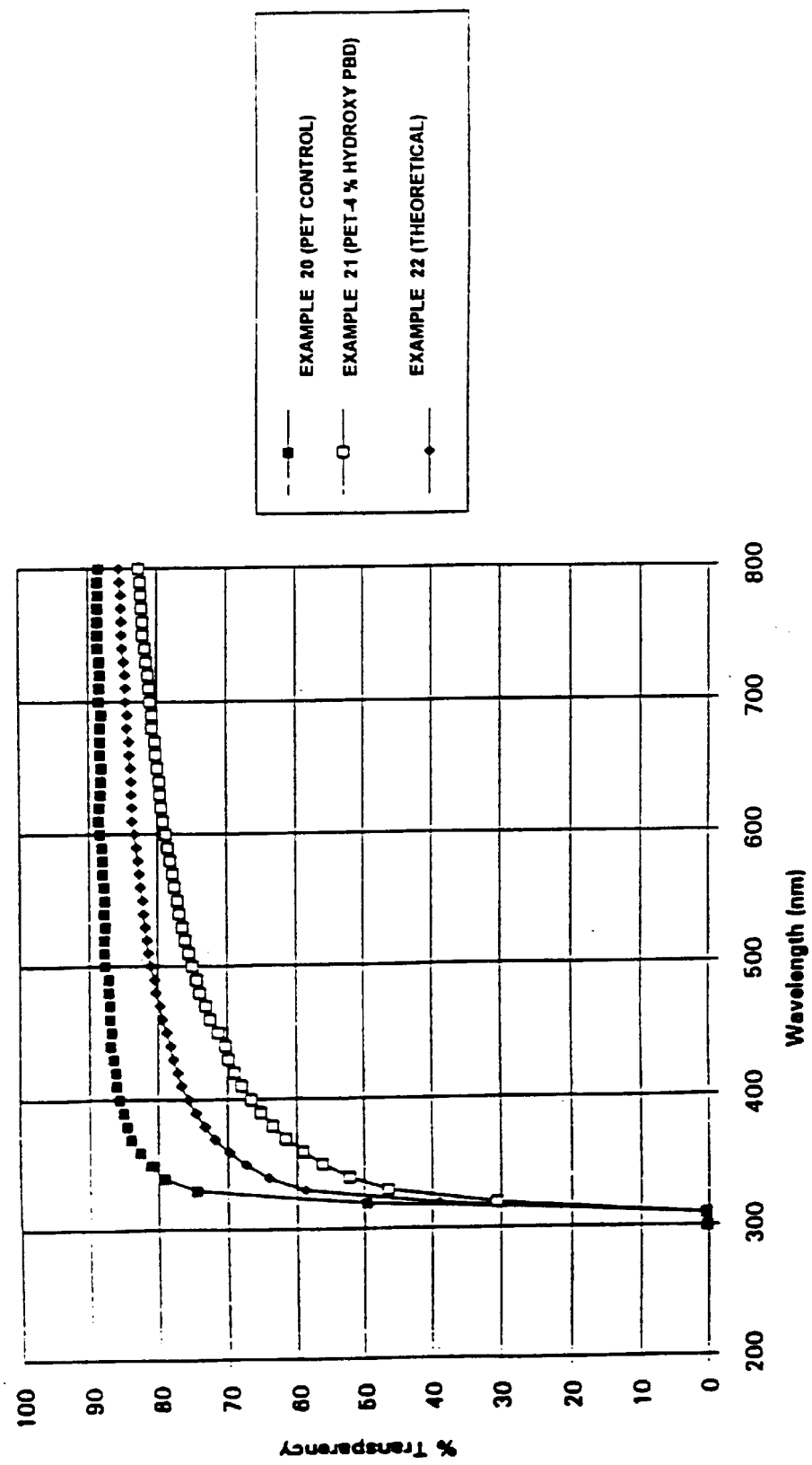
FIGURE 9 - EXAMPLES 20 TO 22

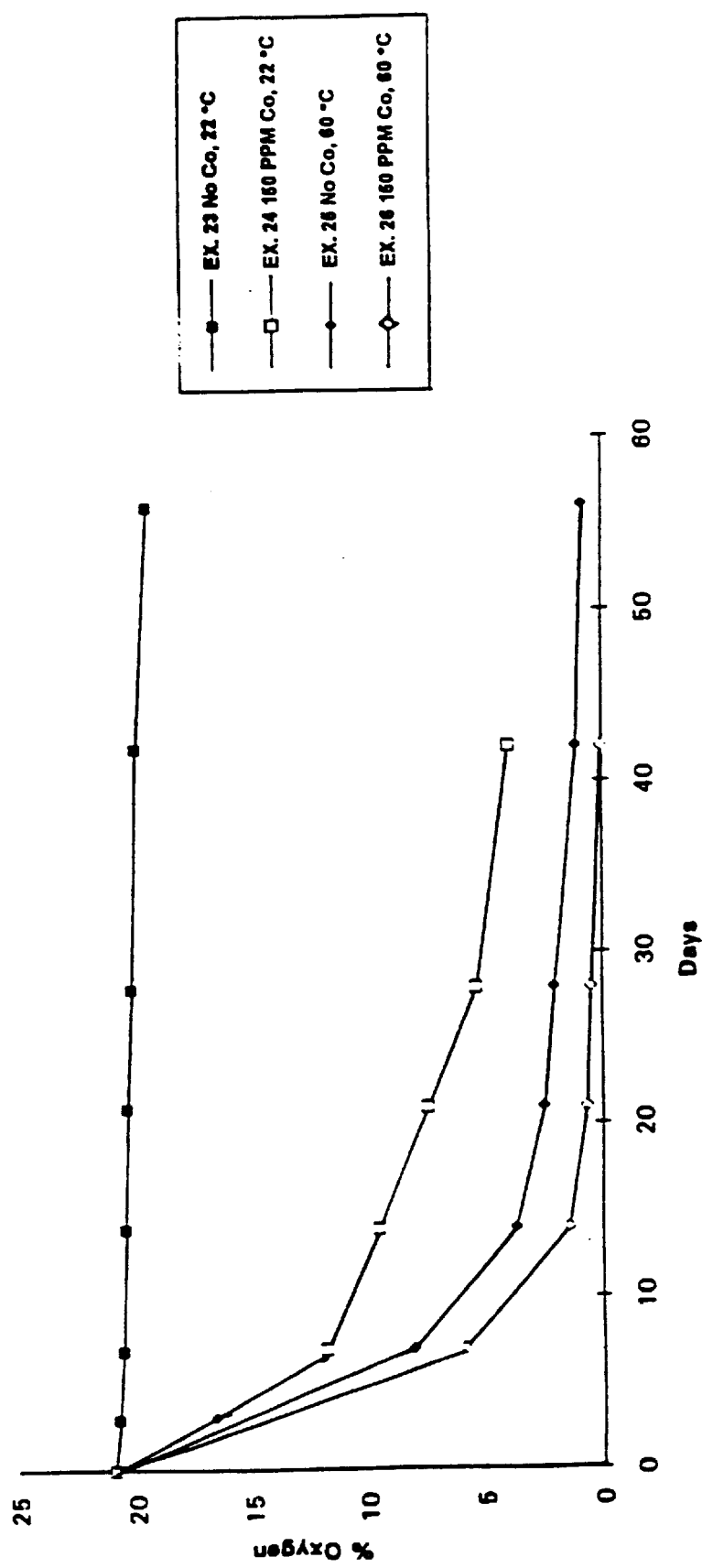
FIGURE 10 - EXAMPLES 23 TO 26
EFFECT OF COBALT ON OXYGEN UPTAKE
2 MIL THICKNESS BIAXIALLY ORIENTED COPOLYCONDENSATE FILMS
96 WT % PET - 4 WT % PBD

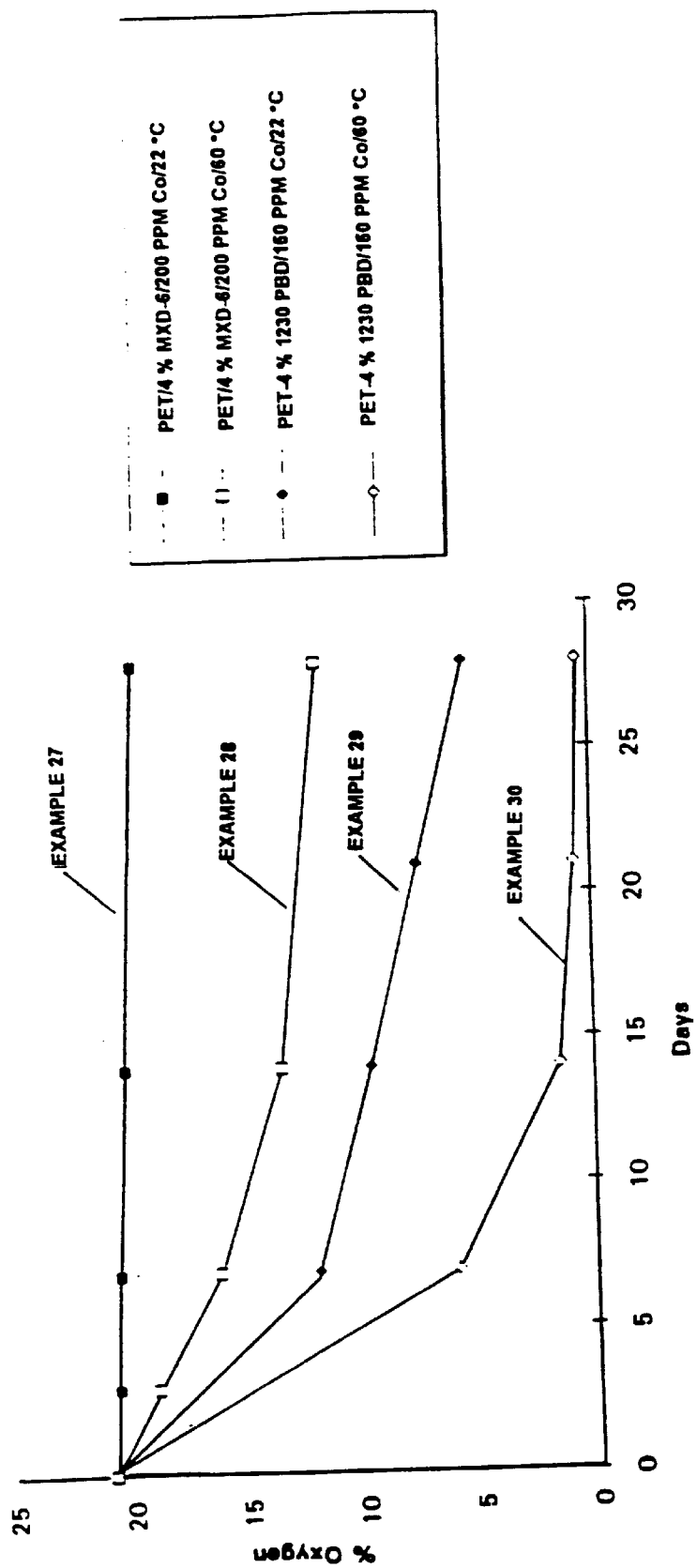
FIGURE 11 - EXAMPLES 27 TO 30
COMPARISON WITH A COMMERCIAL OXYGEN SCAVENGING SYSTEM
2 MIL THICKNESS BIAXIALLY ORIENTED FILMS
96 WT % PET/4 WT % PBD (MW 1230)/150 PPM Co/ COPOLYCONDENSATE
VS
96 WT % PET/4 WT % MXD-6/200 PPM Co/ BLEND

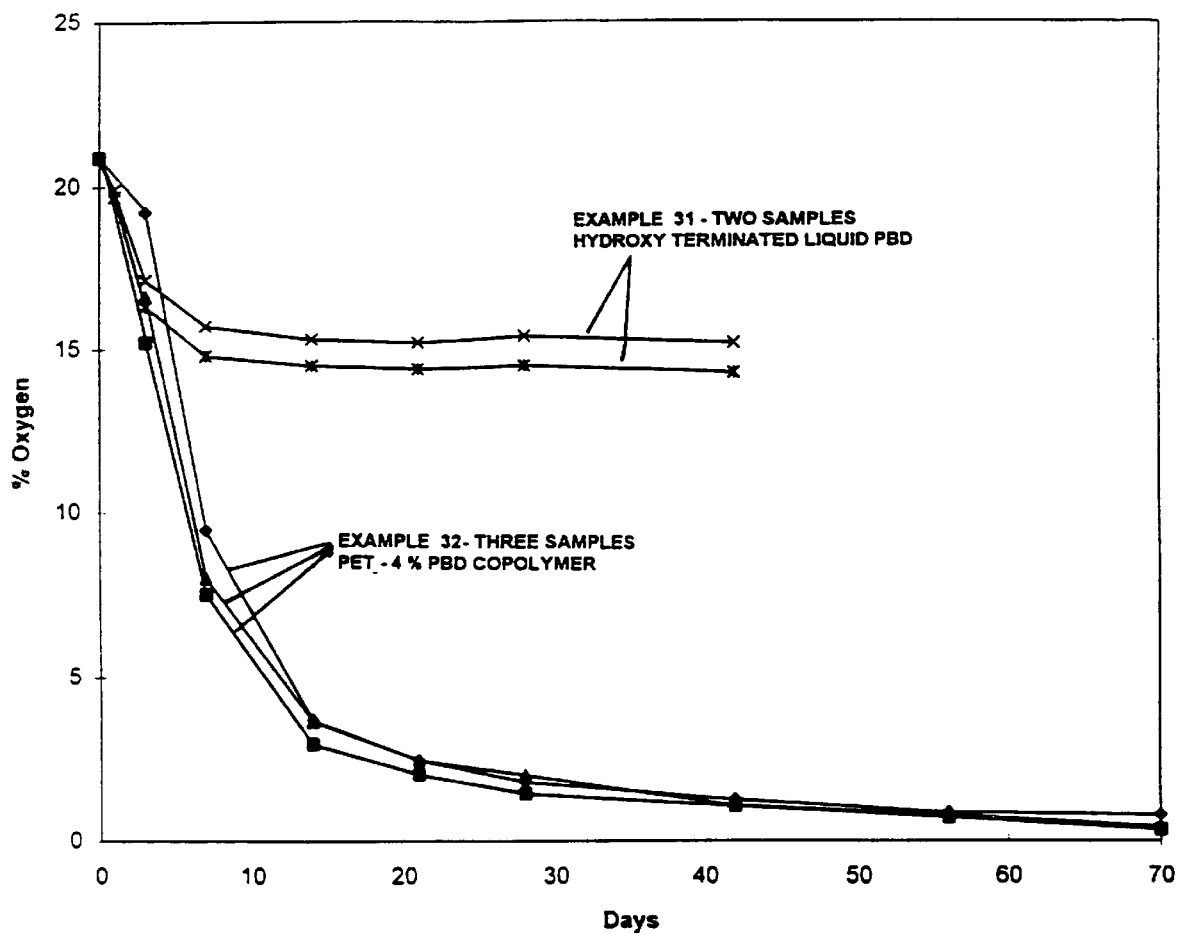

US 6,509,436 B1

OXYGEN SCAVENGING CONDENSATION COPOLYMERS FOR BOTTLES AND PACKAGING ARTICLES

This is a continuation of Application No. 08/717,370 filed Sep. 23, 1996 now U.S. Pat. No. 6,083,585.

FIELD OF THE INVENTION

The invention generally relates to compositions, articles, and methods for packaging oxygen-sensitive substances, especially food and beverage products. The invention is directed to oxygen barrier materials of the so-called active oxygen scavenger type. The active oxygen scavengers of this invention are condensation copolymeric substances which can be used for bottles and packaging. These compositions have an ability to consume, deplete or reduce the amount of oxygen in or from a given environment in the solid state at ambient temperatures. Formulations are disclosed which may be fabricated into clear plastic bottles suitable for recycle with other polyester bottles.

BACKGROUND OF THE INVENTION

Plastic materials have continued to make significant advancements into the packaging industry due to the design flexibility of their material and their ability to be fabricated in various sizes and shapes commonly used in the packaging industry. The deployment of plastic materials into films, trays, bottles, cups, bowls, coatings and liners is already commonplace in the packaging industry. Although plastic materials offer the packaging industry many benefits with an unlimited degree of design flexibility, the utility of plastic materials has remained inhibited in situations where barrier properties to atmospheric gases (primarily oxygen) are necessary to assure adequate product shelf life. When compared to traditional packaging materials such as glass and steel, plastics offer inferior barrier properties which limits their acceptability for use in packaging items that are sensitive to atmospheric gases, particularly when the exposure to the atmospheric gases will entail extended time periods. The packaging industry continues to seek packaging materials which offer the design flexibility of plastics with the inherent recycle advantage of plastics and at the same time have the barrier properties of glass and steel.

The packaging industry has developed technology to improve the barrier properties of plastic containers by developing multi-layer containers that offer mixed polymer layers. These laminated packaging containers offer improved barrier properties approaching, but not comparable to, those of glass and steel while sacrificing many of the recycling benefits associated with single layer containers such as polyethylene terephthalate (PET) and polyethylene naphthalate (PEN) bottles. Furthermore, depending on the mixtures of polymers, copolymers, blends, etc., used in the layers, clarity of the layered container is often substantially diminished. Maintaining the proper balance of recyclability, barrier properties, and clarity is most critical in bottling applications. However, these are common concerns among a wide range of plastic packaging uses.

PET has made significant inroads into bottling and packaging applications at the expense of the use of glass containers but primarily in applications where the needs for barrier properties are modest. A significant example is the use of PET for soft drink bottles. However, PET barrier properties have limited its use in the packaging of oxygen sensitive drinks such as fruit juices and beer. The most common size for PET soft drink bottles is the two liter capacity bottle but one liter and three liter bottles are also frequently seen. The wall thickness of PET employed for these larger sized bottles provides an adequate oxygen barrier for such products. Bottling fruit juice and other products of similar oxygen sensitivity in large bottles with thick PET walls has recently been commercialized. The increased wall thickness is needed to improve the barrier properties of the container but has a negative impact on the economics of the container. The ratio of packaging material to package volume has limited PET bottles to multi-serve container uses for packaging of oxygen sensitive foods and beverages. As the oxygen sensitivity of the packaged product increases or as the size of the package decreases, at some point the ratio of packaging material versus package volume becomes prohibitive. When that occurs, the production and use of thick walled conventional PET bottles is no longer economically viable as the cost of the packaging is disproportionate to the value of the packaged product. The availability of beverages and food in single serve plastic bottles and packages is an important economic consideration particularly for use in unusual sales locations such as at special events, in stadiums or arenas, and in similar situations where the amount of product sold is often determined by how quickly the product can be transferred from a multi-serve container to a single/consumer serving. Often, the sale of beverages in single serve glass or metal containers is prohibited at such locations because of the possibility that the empty containers may be hurled as missiles by rowdy attendees at such events. Sale of beverages in single serve plastic bottles, however, is normally permitted in all situations.

One possibilty for extending the economic viability of packaging oxygen sensitive materials in smaller or individual serving containers is to decrease the thickness of the bottle wall so as to maintain the same proportion of packaging material to package volume as would be found for larger bottles. However, containers with thinner walls made from conventional bottling polyester permit more passage of oxygen to the packaged product than thick bottle walls. As such, the shelf life and other required features of the bottle would not be satisfactory. However, modified thin bottle walls which maintain or improve the oxygen barrier characteristics of conventional bottling polyester could provide an answer. The use of multi-layer bottles that contain an inner, sometimes sandwiched, layer of a second higher barrier polymer material compared to the outer polymer layers, is already commonplace. Typically the center layer is a high barrier polymer that exhibits barrier properties by slowing the permeability of oxygen through the container wall. Such a system would be categorized as a passive barrier. A common construction for such passive barriers would comprise inner and outer layers of PET with a center layer of ethylene-vinyl alcohol (EVOH) polymer. Another method for providing increased oxygen barrier properties is the incorporation into the bottle walls of substances capable of intercepting and scavenging oxygen as it attempts to pass through the walls of the container. This method also affords the opportunity to eliminate unwanted oxygen from the package cavity wherein said oxygen may have been inadvertently introduced during packaging or filling. This method of providing oxygen barrier properties where a substance consumes or reacts with the oxygen is known as an "active oxygen barrier" and is a different concept from passive oxygen barriers which attempt to hermetically seal a product away from oxygen via the passive approach.

One method for use of active barriers would be to make a three layer bottle which actually appears to be a mono-layer bottle. In the three layer bottle, the inner and outer layers are made of the same generic family of polymeric materials. The method applies to many packaging articles, but in the case of a bottle, the construction would comprise two polyester layers sandwiching a middle layer having outstanding oxygen scavenging characteristics atypical of the outer polyester layers. When the middle layer is very similar to the outer polyester layers, the article appears to be only a single layer. Of course many options exist including the use of a relatively homogeneous mono-layer comprising oxygen scavenging copolymers.

Incorporation of an active oxygen scavenger into the walls of a bottle provides a very effective means for elimination or at least control of the amount of oxygen which reaches the cavity of the package. However, there are some exacting demands which are placed upon the active oxygen scavenging walls of the bottle. One consideration is that the relatively thin walls of the bottle should be of sufficient strength and rigidity to withstand the rigors of filling, shipping, and use by consumers. The oxygen scavenging capacity of the bottle walls should be of sufficient capacity to allow for adequate shelf life and normal product turnover intervals. Shelf life and turnover intervals require that the oxygen scavenging should occur for extended periods of time. Most packaged products are stored and transported at room temperature or under refrigeration which mandates the necessity for oxygen scavenging activity at these temperatures. Of course, the oxygen scavenger should exist as a solid at these temperatures so as to be shaped and formed into packaging articles, i.e., these storage and transporting temperatures must be below the glass transition temperature ($T_g$) of oxygen scavenging compositions. The preferred compositions would absorb oxygen at a rate faster than the permeability of oxygen through the packaging wall for the planned shelf-life of the packaged product while having enough capacity to remove oxygen from within the package cavity if necessary. In those applications requiring clarity, the packaging article should have optical properties approaching those of PET. Finally, the preferred thin walled bottles should be suitable for recycle with other polyester bottles. In order to be meaningful, the recycling must be conducted without the need for any special physical processing such as delamination or the need for any special chemical processing such as depolymerization. What is needed are oxygen scavenging compositions, methods for the production of said compositions and methods of using the compositions in packaging articles so as to satisfy all the demands as recited above.

INVENTION SUMMARY AND REVIEW OF PRIOR ART

A number of attempts have been made to prepare oxygen barrier and/or scavenging bottle walls. Some approaches have involved the incorporation of inorganic powders and/or salts into the bottle walls. Most of these systems have numerous shortcomings including poor clarity, poor processing properties, insufficient oxygen uptake, and non-recyclability. There have been numerous approaches involving the use of laminated structures. Most of these have at least one or several disadvantages and most also suffer from lack of recyclability. Satisfying the need for a strong, recyclable, clear, thin walled polyester bottle with commercial oxygen scavenging capacity has continued to be a subject of substantial technical and commercial interest.

One method proposed for extending the range of utility for PET bottles is the incorporation of oxygen scavenging substances into PET. Such incorporation would increase the oxygen barrier properties of the modified PET permitting thinner bottle walls which would be ideal for smaller containers, especially for the bottling of oxygen sensitive substances. Naturally, increasing the oxygen barrier properties of PET must be done without sacrificing the salient features and properties of PET. For the purposes of this invention the salient features and properties of PET include (1) transparency, (2) rigidity, (3) good passive oxygen barrier properties, (4) recycle capability, (5) reasonable cost, and (6) a long history of experience and use in the packaging industry. Thus, there were at least two separate considerations involved in development of materials and methods that could be used to improve the oxygen scavenging properties of PET. Firstly it was necessary to identify a list of materials which may possess high oxygen scavenging capacity so that only small amounts of such materials would be required for use in fabricated form. Logic dictated that use of the smallest amount of material would have the least impact on the existent salient features of packaging polyesters. However, other considerations had to be made in addition to oxygen scavenging capacity including such factors as cost, clarity, processability, recycling, etc. Secondly, it was necessary to devise a means for innocuously incorporating the more promising scavenging substances into the packaging and bottling polyesters to form desirable oxygen scavengers.

Applicants were able to satisfy both of these considerations by developing novel condensation copolymer compositions comprising predominantly polyester segments and a lesser weight percentage of oxygen scavenging hydrocarbon segments. The oxygen scavenging hydrocarbon segments need be present only in an amount necessary to provide the degree of oxygen scavenging capacity needed for the particular application and are comprised of polyolefin oligomer segments which have been incorporated into the copolymer. For this invention, predominantly polyester segments is defined as at least 50 wt % polyester segments based on the weight of the copolymer. Since the copolymers comprise mainly polyester segments, such as PET segments, the properties of the copolymers formed remain very similar to those of the precursor polyester, i.e., the unmodified or homopolymer polyester lacking the oxygen scavenging hydrocarbon segments. The oxygen scavenging ability of these novel copolymers is present at temperatures both above and below their glass transitions temperature ($T_g$). However, a significant advance in the state of oxygen scavenging art arising out of this invention is the ability of these compositions to scavenge oxygen at temperatures below the $T_g$, (i.e., in the solid state). The $T_g$'s of the novel compositions of this invention are typically above 62° C. which means the copolymers can be made into or incorporated into packaging articles that have commercial oxygen scavenging capacity at ambient temperatures in the range of about 0° C. to about 60° C. Also, since the novel copolymers are comprised largely of polyester segments, bottles constructed comprising the novel copolymers are suitable for recycle with conventional polyester bottles from other sources and with no need for special processing. Applicants have also devised methods for making the novel copolymers and methods for their use in the fabrication of bottles and other packaging articles.

A search of prior art has turned up some background references. Among these references are U.S. Pat. Nos. 5,310,497, 5,211,875, 5,346,644 and 5,350,622 (Speer, et. al.) which disclose the use of poly(1,2-butadienes) as an oxygen scavenger. But there is no disclosure of the compositions of this invention nor any recognition of the desirability to disperse this oxygen scavenging capacity in a polyester in any manner, and certainly nothing to suggest its use as segments in a condensation copolymer system. Furthermore, these addition type polymers of Speer, et. al., disclose oxygen absorption only above the glass transition temperature of the polymer system. The $T_g$ of the Speer, et. al. materials is well below the use temperature commonly employed for packaging. This is a severe limitation to the Speer, et. al. polymers as it excludes the possibility for fabrication of the polymers into rigid packaging articles having oxygen scavenging capacity. It is well understood by those of ordinary skill in the art that below the glass transition temperature the polymer is in a glassy or solid state which gives the container rigidity. Further, it is also understood by those of ordinary skill in the art that the permeability of oxygen significantly increases above the glass transition temperature of the polymeric material. Thus in those systems where oxygen absorption occurs above the glass transition temperature the utility of the material is offset in part or totally by the increase in permeability of the oxygen through the polymer system or in loss of rigidity (shape). Simple polybutadienes as high molecular weight addition polymers are, in general, non-rigid and ill-suited by themselves to be used as a packaging resin or incorporated as a component of a rigid PET bottle construction.

As an example of prior art directed to the use of butadiene based copolymers with PET in general, in Japanese patent document 59196323 (Nov. 7, 1984) enhanced impact resistance or mechanical properties have been disclosed for copolymers from hydrogenated hydroxy terminated polybutadiene with PET oligomers, phenol, and terephthalic acid dichloride. It is known that hydrogenation serves to eliminate or at least severely diminish the number of tertiary and secondary hydrogens present in the butadiene. As will be discussed later in this application, oxygen scavenging ability is related to the presence and availability of secondary and tertiary hydrogen atoms in a hydrocarbon substance. Hydrogenation of the unsaturation in the polybutadiene polyolefin would serve to eliminate most of the secondary and tertiary hydrogen atoms sites and render such a composition impotent in terms of oxygen scavenging potential. As such the absence of hydrogenation of polybutadiene oligomers in the copolymers of this invention is an important distinction over this prior art. Also, in Japanese patent document 59193927 (Nov. 2, 1984) reactive extrusion has been described for preparation of aminated hydrogenated polybutadiene with polyester under catalytic action. U.S. Pat. No. 5,244,729 discloses the use of PET-maleated polybutadiene as an adhesive (one of many examples) for vermiculite platelets dispersed in oriented PET or polypropylene to create passive barriers comprising vermiculite platelets. Such a dispersion would necessarily be opaque as a result of the specified particle sizes ranging from 0.1–5.0 microns which would interfere with transmission of visible light. Applicants disclose copolymers with very small polyolefin oligomer segments which maintain transparency. Furthermore, there is no apparent recognition of the active oxygen scavenging capability of the polybutadiene functionality alone or for its use without the vermiculite. Japanese patent document 56129247 (Oct. 9, 1981) discloses hydrogenated diene copolymer with PET as a nucleant for PET crystallization. Japanese patent document 7308358 (Mar. 13, 1973) discloses PET-polybutadiene together with triisocyanates as an adhesive for polyester fiber tire cords in natural rubber. None of these prior art references has disclosed or made obvious the copolycondensates of this invention nor their efficacy for solid state oxygen scavenging.

This invention provides novel compositions in the form of copolycondensates which are effective oxygen scavengers that can absorb oxygen at packaging temperatures which are below the glass transition temperature of the polymeric compositions when deployed in the walls of plastic bottles or when incorporated in other packaging materials such as films, cups, cartons, bottle cap liners, can liners, food bags, trays, and the like. In a series of embodiments of this invention, this has been achieved by the preparation of copolymers capable of absorbing oxygen in the solid state below their glass transition temperatures comprising predominantly polyester segments with a sufficient amount of polyolefin oligomer segments to achieve the oxygen scavenging capacity required.

Also disclosed are methods of preparation of the oxygen scavenging copolycondensates. In a preferred embodiment, the copolycondensates are prepared by reactive extrusion transesterification of polyester with polyolefin oligomers which have been functionally terminated with end groups capable of entering into polycondensations.

Also methods of protecting oxygen sensitive substance by appropriate packaging are disclosed in a series of embodiments wherein oxygen sensitive substances are packaged in a suitable article of manufacture comprising the copolymers described above in sufficient quantity to serve as an oxygen barrier.

In several embodiments of this invention plastic bottles of sufficient oxygen scavenging capacity are disclosed so as to permit bottling, transportation, storage and sale of oxygen sensitive substances such as fruit juice without the need for cooling or refrigeration.

Finally, several bottling embodiments of this invention disclose polyester bottles having commercial oxygen scavenging capacity which are suitable for recycle with other polyester bottles without the need for any special processing.

BRIEF DESCRIPTION OF THE DRAWINGS

FIG. 9 is a graph which compares the clarity of films of the PET copolymers of this invention to that of unmodified PET.

FIG. 10 is a graph which shows the effect on oxygen scavenging rates and capacity of adding cobalt to the copolymers of this invention.

FIG. 11 is a graph which compares the oxygen scavenging capacity of the copolymers of this invention to that of a commercially available oxygen scavenger system.

FIG. 12 is a graph which compares the oxygen scavenging capacity of the copolymers of this invention to that of the unreacted starting materials.

DESCRIPTION OF THE PREFERRED EMBODIMENTS

Figure 1:
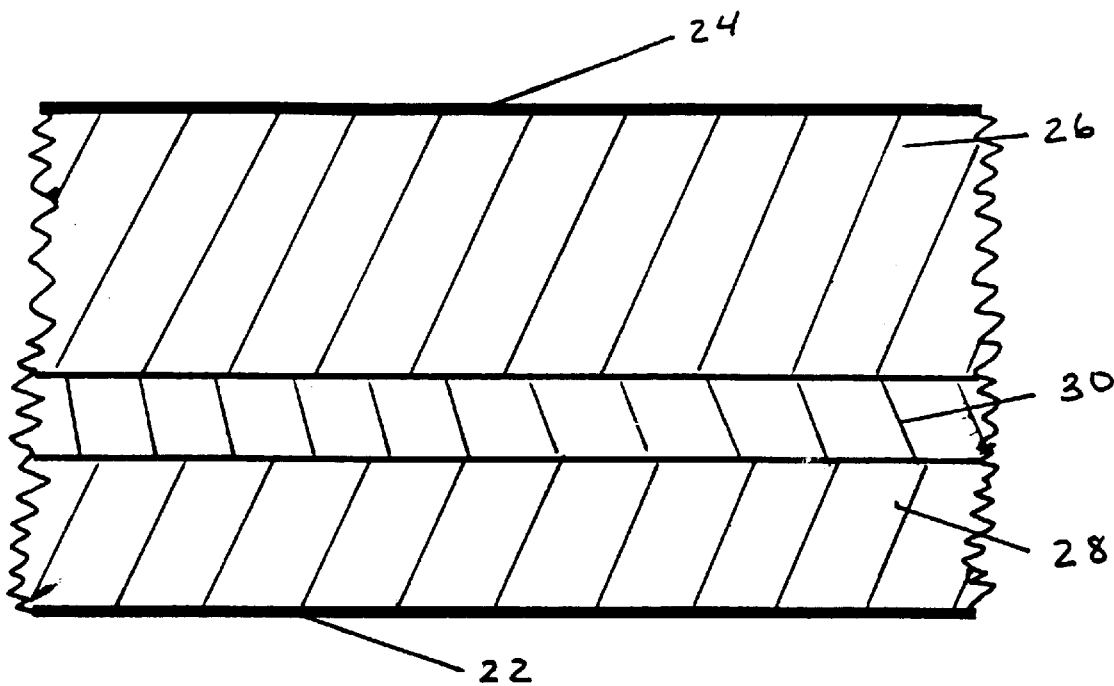
FIG. 1 is a cross sectional view of the preferred oxygen scavenging bottle wall and film construction.

The polyesters, including PET, used for fabrication of plastic bottles and other packaging articles can be the same polyesters from which the polyester segments are derived in the novel oxygen scavenging condensation copolymers disclosed in this invention. Frequently, these polyesters are prepared by polymerizing together (typically on an equimolar basis and in the presence of suitable catalyst) two separate chemical substance monomers as depicted in Formula I and Formula II to form the repeating polyester units depicted in Formula III.

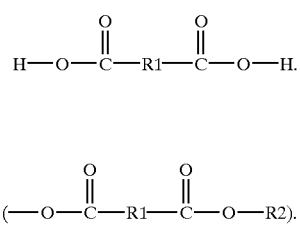

R1 in the dicarboxylic acid monomer of Formula I is often, but not necessarily, a divalent aromatic radical which usually has one, two, or three aromatic rings, which in turn may be fused or separated when R1 represents multiple rings. R1 may also be aliphatic, alicyclic, or mixtures of aromatic, aliphatic and alicyclic in any possible combination in the case of polyester copolymers. For PET, R1 is the divalent 1,4-phenyl radical and Formula I would represent terephthalic acid. The preferred Formula I species are terephthalic acid, isophthalic acid, phthalic acid, 2,6-naphthalene dicarboxylic acid, other naphthalene dicarboxylic acid isomers, mixtures thereof, and mixtures of at least one of the preferred species with other species encompassed by Formula I. Especially preferred are terephthalic acid, 2,6-naphthalene dicarboxylic acid, mixtures thereof and mixtures of at least one of the especially preferred species with other species encompassed by Formula I.

R2 in the diglycol monomer of Formula II may be any divalent alkylene or substituted alkylene radical or mixtures thereof. For bottling and packaging polyesters R2 is often, but not necessarily, a divalent $C_2$ to $C_4$ alkylene radical. For PET, R2 is divalent 1,2-ethylene and Formula II would represent 1,2-dihydroxy ethane. The preferred Formula II species are 1,2-dihydroxy ethane, 1,3-dihydroxy propane, 1,4-dihydroxy butane, cyclohexanedimethanol and mixtures comprising at least one of the four preferred in all possible combinations with each other or other species encompassed by Formula II. Especially preferred is 1,2-dihydroxy ethane alone or mixed with other Formula II species.

In somewhat greater detail, the preferred polyester resins suitable for use in the present invention include linear polyesters of an aromatic dicarboxylic acid component and a diol component. Examples of dicarboxylic acid components include terephthalic acid, isophthalic acid, naphthalenedicarboxylic acid, diphenyl ether carboxylic acid, diphenyl dicarboxylic acid, diphenyl sulfone dicarboxylic acid and diphenoxyethanedicarboxylic acid. Examples of diol components include ethylene glycol, trimethylene glycol, tetramethylene glycol, neopentyl glycol, hexamethylene glycol, cyclohexanedimethanol, tricyclodecanedimethanol, 2,2-bis (4-p-hydroxy ethoxy phenyl) propane, 4,4-bis (p-hydroxy ethoxy) diphenyl sulfone, diethylene glycol and 1,4-butanediol.

Polyesters prepared from the above components are well known in the art, and can be prepared via the dicarboxylic acid, or suitable derivatives such as dimethyl esters of the above acids. In many cases, polyesters suitable for use in this invention are available for purchase from a variety of suppliers. Examples of polyesters that can be employed in the present invention include polyethylene terephthalate, polybutylene terephthalate, polybutylene terephthalate elastomer, amorphous polyesters, polycyclohexane terephthalate, polyethylene naphthalate, polybutylene naphthalate and mixtures of the foregoing. Specific examples of commercially available polyester resins useful in the present invention are Goodyear PET resins 7207 and 9506 ("C-PET"), Teijin Limited PET resins TR8580, and Eastman Kodak PET resin 9902. In selected embodiments, the present invention also contemplates the use of recycle PET as part of the feed wherein said recycle PET may already contain low levels of branching agent or other additives originally formulated therein.

Other suitable polyester resins for use in the present invention include branched polyesters. These branched species could be prepared using mainly difunctional carboxylic acid type monomers together with some carboxylic acid monomers having a functionality greater than two and then polymerizing these acids with polyols. Alternatively, branched species could be prepared using mainly diol monomers together with some polyols having more than two hydroxy groups and then polymerizing these polyols with multi-functionality acid monomers. Examples of acids having functionality greater than two include trimellitic acid, and pyromellitic acid (or their anhydrides). Polyols having functionality greater than two include glycerol, pentaerythritol, and the like.

Especially preferred for this invention are polyesters comprising repeating units selected from the group consisting of those encompassed by Formula IV and Formula V and wherein n in each of Formulas IV and V has a value in the range of 2–4.

Formula IV

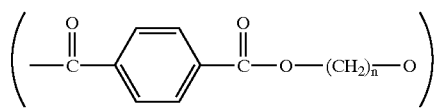

Formula V

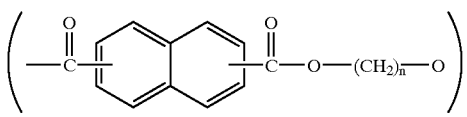

When monomers of Formula I and monomers of Formula II react to give the repeating structure of Formula III, water vapor is formed during the reaction. This type of polymerization is known as polycondensation or condensation polymerization. While the reason for such nomenclature is not important, it seems likely that the formation of water vapor during the reaction contributed to the use of terminology such as condensation polymerization. In the book "GLOSSARY OF CHEMICAL TERMS" by C. A. Hampel and G. G. Hawley, Von Nostrand, 1976, a definition for condensation polymerization is offered on Page 67. According to this reference, a condensation polymer is a linear or three dimensional macromolecule made by the reaction of two organic molecules usually with the formation of water or alcohol as a by-product. The reaction is repetitive or multi-step as the macromolecule forms. These repetitive steps are known as polycondensation. Among the examples given as condensation polymers are polyesters and polyamides. In 1929 Carothers (W. H. Carothers, J. Am. Chem. Soc. 51,2548 (1929)) proposed a generally useful differentiation between two broad classes of polymers. One of the Carothers' classes was condensation polymers in which the molecular formula of the structural (repeating) unit or units in the polymer lack certain atoms present in the monomer or monomers from which it was formed, or to which it may be degraded by chemical means. Carothers' other class was addition polymers in which the molecular formula of the structural (repeating) unit or units in the polymer is identical with that of the monomer from which the polymer is derived. The polymers and copolymers of importance in this invention are those which Carothers would have considered to be condensation polymers in view of their polymerization characteristics and the formulas of the repeating units in the polymers versus those of the forming monomers. In one aspect of this invention, novel condensation copolymers are disclosed comprising predominantly polyester segments of the types encompassed by Formulas IV and V and oxygen scavenging hydrocarbon segments in the amount effective to provide the required oxygen scavenging capacity. As will be explained in further detail later, these hydrocarbon segments of the condensation copolymer are in actuality oligomers of an addition polymer.

While Formula I depicts a dicarboxylic acid species and Formula II depicts a dihydroxy species, it will be recognized by those of ordinary skill in the art that there are numerous other possibilities which, when reacted together, would lead to the repeating polyester structure shown by Formula III. As examples, Formula I could be a diacid halide or a diester of a dicarboxylic acid and still lead to the structure shown in Formula III when reacted with a Formula II species. Of course the by-product would be something other than water in these instances. In a similar manner, replacement of one or both hydrogen atoms by an organic group in the dihydroxy species of Formula II would still give a repeating polyester structure of Formula III when reacted with a Formula I species. The by-product would probably be an alcohol instead of water in such instances. In general, the terminal groups on the monomers used in forming the bottling and packaging polyesters (which eventually will be transformed into the majority of the segments in the oxygen scavenging copolymers of this disclosure) are relatively unimportant to this invention. It will be understood by those of ordinary skill in the art that polyester segments once formed (and regardless of the monomers from which they were formed) would still function in the manner as prescribed for this invention. In a related manner, it will be appreciated by those of ordinary skill in the art that the preferred species and the especially preferred species of Formula I and Formula II recited above would also encompass these alternative terminal functional groups which lead essentially to formation of the same polyesters and polyester segments.

An important concept in this invention is the formation of copolymers which comprise predominantly polyester segments derived from the bottling and packaging polyesters described above as one of the components of the copolymer. The oxygen scavenging copolymers of this invention are copolycondensates comprising predominantly copolyester segments and hydrocarbon segments wherein the hydrocarbon segments need be present only in sufficient quantity to provide the needed oxygen scavenging capacity. As will be shown in later examples, the oxygen scavenging compositions of this invention are true, 100% copolymers. However, because of the low weight percentage of hydrocarbon employed, the hydrocarbon segments appear to exist as hydrocarbon segment areas of oxygen scavenging capacity dispersed throughout the predominately present polyester segments of the copolymer. It is these hydrocarbon segment areas, of course, which actually account for the oxygen scavenging capability of the copolycondensates in that the hydrocarbon segments are the only moieties present which have oxygen scavenging propensity and capacity.

Of course it was necessary for applicants to focus on evaluation and selection of appropriate hydrocarbon segments which could be incorporated into a condensation copolymer and afford the necessary oxygen scavenging capacity while not detrimentally affecting the salient features and properties of the packaging polyesters and segments derived therefrom for the copolymer. Applicants are subscribers to the theory that the mechanism of oxygen uptake in hydrocarbon materials is by fixation of the oxygen onto the hydrocarbon material via formation of hydroxy groups. Further, this same theory purports that the hydroxy groups which consume the oxygen are formed via a free radical process involving an intermediate peroxy moiety and that carbon atoms having only one hydrogen attached (a so called tertiary hydrogen) are more susceptible to free radical formation than carbon atoms with two hydrogens attached (so called secondary hydrogens) which in turn are more susceptible to free radical formation than carbon atoms with three hydrogens attached. Applicants recognized that hydrocarbons such as polyolefins, especially polydienes, provided a potentially good source of secondary and tertiary hydrogens. Further analysis confirmed that polyolefins in general were good oxygen scavenging segment candidates particularly when used as low molecular weight polyolefin oligomers. The preferred polyolefin oligomers for use as hydrocarbon segments in the oxygen scavenging copolycondensates are polypropylene, poly(4-methyl)1-pentene and polybutadiene. While it is not a hydrocarbon material as such, polypropylene oxide glycol oligomer also was identified as a potentially useful oxygen scavenging substance. Of these, polybutadiene oligomer is especially preferred since it has a high oxygen scavenging propensity and also because it is commercially available in the form necessary for making the oxygen scavenging copolycondensates of this invention by the preferred method of this invention.

As previously stated, the polyolefin oligomer segments need to be present in the copolycondensates of this invention only to the extent necessary to afford the desired oxygen scavenging capacity. One reason for keeping the polyolefin oligomer segments at only the level required is to satisfy the objective of keeping the copolycondensate as similar as possible to the polyester homopolymer. In practice, it has been found that the presence of polyolefin oligomer segments in the range of about 0.5 wt % to about 12 wt % based on weight of the copolycondensate is a typical wt % usage range. Preferred is the presence of polyolefin oligomer segments in the range of about 2 wt % to about 8 wt % based on weight of the copolycondensate. Especially preferred is the presence of polyolefin oligomer segments in the range of about 2 wt % to about 6 wt % based on weight of the copolycondensate.

Selection and use of an appropriate molecular weight for the polyolefin oligomer segments may be an important consideration depending on end use in that it can effect the properties of the oxygen scavenging copolycondensates. For a given loading level of the copolycondensates in terms of wt % polyolefin oligomer segments, it is possible to use low molecular weight oligomer and end up with a higher mole % of polyolefin oligomer segments than would be realized by using a high molecular weight polyolefin oligomer at the same wt % loading level. Intuitively, it would appear (in absence of data to the contrary) that use of low molecular weight polyolefin oligomer segments results in a more uniform dispersion of the oligomer segments throughout the copolymer. Also, it would appear that the use of lower molecular weight oligomer segments would cause the segments to be physically smaller than the segments obtained at the same loading level with higher molecular weight oligomer segments. The cross sectional size (diameter) of the polyolefin oligomer segments is important in applications where clarity of the copolycondensates is a requirement. The polyolefin segments appear to inhibit (scatter) the transmission of light when too many of the segments are about the size of the wavelengths of visible light. In a later and more extensive discussion of this subject, it will be shown that other factors effect the size of the oligomer segments in addition to molecular weight of the oligomer. As part of that discussion, detailed conditions will be disclosed for controlling the size of the oligomer segments so as to achieve the desired optical, physical, and scavenging properties for the copolycondensates. However, it should be noted at this juncture that it has been found experimentally that a preferred molecular weight range for the polyolefin oligomer is in the range of about 100 to about 10,000. Use of molecular weights within this preferred range results in copolycondensates having the desired physical and oxygen scavenging properties. Use of polyolefin oligomer having molecular weights within the especially preferred range of 1,000 to 3,000 results in polycondensates that not only meet the physical and oxygen scavenging requirements but also satisfy clarity requirements in applications where clarity must be considered.

A series of discussions were held with representatives of the packaging industry aimed at establishment of minimum requirements to be met by active oxygen scavenger compositions. Out of these meetings came a transparency minimum requirement for clarity of the oxygen scavenger copolycondensates of about 70% of that of the homopolymer or unmodified PET or other polyesters and a minimum oxygen scavenging capacity of about 0.4 cc of oxygen per gram of copolymer at ambient temperatures. An oxygen scavenging capacity of about 0.4 cc of oxygen per gram is a typical value for other oxygen scavenging systems already commercially available. As is the case for homopolymer polyester, the clarity of the copolycondensates is improved after biaxial orientation, a procedure which is common to most fabrication processes envisioned for the copolycondensates. The copolycondensates as characterized in the above disclosure will generally have a clarity of at least 70% (at typical film thickness of about 1 to 10 mils after biaxial orientation) of the homopolymer or unmodified polyesters identically tested. Also the copolycondensates will generally have an oxygen absorbing capacity of at least 0.4 cc of oxygen per gram of copolycondensate at ambient temperatures defined to be in the range of about 0° C. to about 60° C. Typically the copolycondensates will generally have a single $T_g$ (as measured by Differential Scanning Calorimetry) of about 65° C.

The copolymers of this invention have the ability to absorb oxygen in the glassy solid state at ambient temperatures of about 0° C. to about 60° C. This functional range for the copolycondensates is below the $T_g$ of these compositions. This behavior is in marked contrast to prior art oxygen scavengers which absorb oxygen at room temperature (or even colder) but still above the $T_g$. It is well understood that gas permeability is greatly increased above the $T_g$ when the material is no longer a solid and therefore serves to nullify the scavenging utility of such scavengers. Of course, these prior art scavenger compositions are relatively non-rigid at room temperature when it is above their $T_g$. Another major advantage of the copolymers of this invention, particularly as compared to oxidizable metal/electrolyte formulations, is that they will scavenge oxygen in the absence of water or moisture. This permits use of the oxygen scavenger copolymers of this invention for packaging dry materials such as electronic components, dry snack foods, medical items, etc. This ability to scavenge oxygen in a dry environment further distinguishes the oxygen scavenger copolymers of this invention over many prior art scavengers which require the presence of water or at least a moist environment.

Generally the preparation of the oxygen scavenging copolycondensates disclosed above will involve a step which comprises adding functionality to at least one or more (preferably more) of the terminal sites available in the scavenging polyolefin oligomer which is to be incorporated as segments in the copolycondensates. The terminal functionally added must be a moiety capable of entering into polycondensation reactions and forming polycondensation linkages when incorporated into a polymer. It will be understood that there may be more than two end sites available for functionalization when there is crosslinking or branching in the polyolefin oligomer. In instances where di or multiple functionality is contemplated, generally it will be multiples of the same functionality, i.e., all hydroxy, all carboxy, or all amino added at plural end sites of the polyolefin oligomer molecule. Those of ordinary skill in the art will recognize that this invention can be practiced even when different, but chemically compatible, terminal functional groups are present on plural end sites of the polyolefin oligomer molecules. As noted previously, the only requirement is that the terminal functionality groups must be capable of entering into polycondensation reactions. A non-exhaustive list of terminal functional groups includes hydroxy, carboxylic acid, carboxylic acid anhydrides, alcohol, alkoxy, phenoxy, amine, and epoxy. The preferred terminal functional groups are hydroxy, carboxylic acid, and amino. It will be obvious that this step in the preparation can be avoided by using polyolefin oligomers which are already appropriately terminally functionalized and commercially available as such. In this regard, hydroxy terminal functional groups are especially preferred by applicants since hydroxy terminated polyolefin oligomers suitable for incorporation into the oxygen scavenging copolycondensates of this invention are commercially available and offer attractive properties. Further understanding of the process may be gained by considering the chemical species depicted by Formulas VI, VII, and VIII.

VI

In Formulas VI, VII, and VIII, PBD represents a divalent polybutadiene oligomer molecule. Although Formulas VI, VII, and VIII show difunctionality, it has already been previously noted that the PBD may be only singly functionalized or may be functionalized to a degree greater than two when crosslinking or branching of the PBD offers more than two terminal functionalization sites. In the absence of clarity requirements, the molecular weight of the PBD-oligomer molecule is not critical as long as the functionalized PBD can be adequately dispersed as hydrocarbon segments throughout the oxygen scavenging copolycondensates after incorporation therein. Later, in the examples section of this specification, it will be demonstrated that a true copolymer is formed rather than a mixture or blend of PBD and polyester. The molecular weight of the PBD oligomer can influence the final properties of the copolymers formed in terms of clarity, rigidity and oxygen scavenging capacity. Those of ordinary skill in the art will understand the need to balance the properties based on end use needs and select PBD molecular weights which satisfy the end use. In Formula VI, the PBD is dicarboxy terminated. In Formula VII, the PBD is dihydroxy terminated, and in Formula VIII, the PBD is diamino terminated. While Formulas VI, VII and VIII show the hydrogen forms for these species, it will be understood by those of ordinary skill in the art that from one to all of the hydrogens in each of Formulas VI, VII and VIII could be replaced by an organic radical such as alkyl, cycloalkyl, phenyl, etc. and still serve the same purpose in preparation of the oxygen scavenging copolycondensates of this invention. Using the substituted forms of the species of Formulas VI, VII and VIII would simply produce different byproducts in formation of the copolymers. As noted above, this invention could be practiced with only one functional group per PBD or with more than two functional groups per PBD. In Formulas VI, VII and VIII, difunctionality is shown but represents one of many levels of possible functionality. The method of formation of these functionally terminated species is unimportant to the disclosure of this invention. Commercially available forms of the Formula VI (which is especially preferred) include Elf Attochem products R2OLM and R45HT $\alpha,\omega$-polybutanediols.

The similarity in chemical structure of the species represented in Formulas I and VI is easily discerned. Since polycondensation occurs by reaction of the terminal groups, copolycondensates can be formed comprising predominantly polyester segments with some polyolefin oligomer segments. For easier understanding of the composition, it may be useful to think in terms of substitution of the desired amount of the species of Formula VI for an equivalent amount (based on moles) of the species of Formula I yielding copolycondensates having both polyester and polyolefin oligomer segments. As noted previously, the copolymers are true copolycondensates with the unusual feature that some of the segments consist of addition polymer (actually oligomer). In the same way, the similarity of the species of Formula II and Formula VII is easily seen. Copolycondensates may be formed by substitution of the desired amount of the species of Formula VII for an equivalent amount of the species of Formula II. The nature of the polycondensation reaction forming the copolycondensates for these two types of segment substitutions would be similar to that found for formation of the true or unmodified polyester. It would be expected that the by-products formed are similar also. The species of Formula VIII are diamino terminated. A desired amount of these species may be substituted for an equivalent amount of the species of Formula I to produce a slightly different type of copolymer. When prepared in this manner, a condensation copolymer is formed where the linkages in the vicinity of the polyolefin oligomer segments are polyamide linkages. As will be shown later, these represent only a very small percentage, for example, of non-polyester linkages and copolycondensates produced having some polyamide linkages are suitable for purposes hereof just as are copolycondensates of this invention prepared with 100% polyester linkages between the segments. The significant matter is that the polyolefin oligomer with oxygen scavenging capacity has been implanted into the copolycondensate as segments thus providing oxygen scavenging capacity to the product formed while retaining virtually all of the salient features of the original packaging/bottling polyester. These techniques for introduction of desired polyolefin oligomer into the polycondensate when used at the low levels disclosed by the applicants provide a very precise and effective means for the dispersion of oxygen scavenging moiety throughout the copolycondensates. Attainment of a uniform dispersion of oxygen scavenging moiety in the copolycondensate while keeping the properties of the precursor polyester is a key feature of this invention which further distinguishes the oxygen scavenging copolycondensates of this invention over the prior art. Attempting to produce oxygen scavenging materials by making a physical blend of unfunctionalized polyolefin oligomer and polyester generally produces a non-rigid, opaque emulsion which is not useful for packaging. However, when the functionally terminated polyolefin oligomers are mixed or blended with polyester at temperatures in the range of 200° C. in order to melt the polyester, the copolycondensates of this invention will form, at least to some extent, by transesterification. It should be noted that commercially available PET typically has some cobalt in it from its preparation. The cobalt can act as a transesterification catalyst. Therefore blends and mixtures of functionally terminated polyolefin oligomers with polyester, even if designated as such, may be within the scope of this invention as the blending and mixing processes at polyester melt temperatures produce the copolycondensate compositions of this invention.

The preferred polyolefin oligomer starting material is the dihydroxy terminated PBD species having a molecular weight in the range of about 100–10,000. The especially preferred polyolefin oligomer starting material is the dihydroxy terminated PBD species having a molecular weight in the range of about 1,000–3,000. Copolymers formed using PBD within the preferred molecular weight range will generally have a single $T_g$ (as measured by Differential Scanning Calorimetry) of about 65° C. and offer the ability to absorb oxygen at temperatures below the $T_g$. While the single $T_g$ copolymers are preferred, it will be understood by those of ordinary skill in the art that multiple $T_g$ copolymers are also applicable as long as the lowest glass transition temperature is a temperature above the packaging use temperature. The benefit of having a $T_g$ above the packaging use temperature is to afford container design flexibility associated with container rigidity. It is well understood that container rigidity can also be controlled by wall thickness allowing for flexible films to be produced by downgauging with said copolymers.

The copolymers of this invention may be produced using any form of polycondensation processes including direct continuous and/or batch reaction methods commonly used in making PET. The only deviation in the process is that instead of using, for example 50 mole % of a Formula I species and 50 mole % of a Formula II species, some of at least one of the species of Formulas VI, VII, or VIII is included and a corresponding molar amount of Formulas I or II species is withheld from the polymerization process. Alternatively, the copolycondensates can be prepared by taking a polyester, such as PET, and polymerizing it further with the functionally terminated polyolefin oligomer by heating the components to obtain melt homogenization in an extruder. The extruder heating may be accomplished under vacuum or non-vacuum conditions. Those of ordinary skill in the art will recognize this form of processing as reactive extrusion. In such reactive extrusion processes, polycondensation occurs and the product is, in part or in whole, a copolymer comprising segments of the starting polyester and segments of the polyolefin oligomer rather than a simple melt blend of the individual starting components. Reactive extrusion as described above, is the preferred method of making the copolycondensates of this invention.

In direct polycondensation processes, substitution of the desired amount of the functionally-terminated polyolefin oligomer for approximately an equivalent amount of one of the unmodified condensation polymer monomers results in high molecular weight copolymer. In this case, the desired amount of functionally-terminated polyolefin oligomer can replace equivalent molar amounts of one of the polyester monomers. In the case of direct polycondensation, the amount of functionally terminated polyolefin oligomer that absorbs oxygen can be varied widely as long as the resulting copolymer exhibits the desired end state properties such as scavenging capacity and clarity required for the intended end use. Generally, when prepared in advance of incorporation into packaging articles, it is necessary to maintain the copolycondensates in an inert environment during storage. In most instances, the oxygen scavenging ability of the copolycondensates is present as soon as they are formed and an oxygen exposure induction period has elapsed. The potential for scavenging oxygen may be significantly diminished if left exposed to oxygen (or air) for lengthy periods. Furthermore, lengthy exposure to high temperature in the presence of oxygen can further reduce the oxygen absorption capacity of the copolymers when made into a packaging article and introduce the possibility of thermal decomposition and degradation if overly excessive. Premature loss of oxygen scavenging capacity prior to conversion of the copolymers into a packaging article can be controlled by storing in an inert environment or by addition of suitable stabilizing agents.

While the copolycondensates of this invention may be made by any suitable process, including those yet to be invented, the preferred method of making the copolycondensates of this invention is by reactive extrusion as briefly described above and in more detail below and also again in the examples section of this specification. As part of the reaction extrusion process either alone or in combination with the fabrication step, the starting polyester, such as PET, in the extruder is maintained under an inert atmosphere, preferably that provided by a nitrogen blanket. The functionally-terminated polyolefin oligomer is separately conveyed to the extruder and introduced into the extruder mixing zone. The rate of introduction of polyester into the extruder is adjusted so as to allow sufficient residence time to melt the polyester and cause it to react with the functionally terminated polyolefin oligomer to produce copolymer by transesterification. The preferred residence time is from about 3 to about 5 minutes at the preferred temperature range of about 250–280° C. The functionally terminated polyolefin oligomer is introduced through a separate port on the extruder and the rate of introduction of the polyolefin oligomer is adjusted to provide the amount of polyolefin oligomer segments necessary to achieve the desired oxygen scavenging capacity in the copolycondensates. A typical range for polyolefin oligomer segments is from about 0.5 wt % to about 12 wt % of the total weight of product copolycondensate. A transesterification catalyst, such as a transition metal carboxylate, is also employed in the extruder in a range of about 10–300 PPM of the mixture in the extruder. Cobalt carboxylates are the preferred transesterification catalysts and especially preferred is cobalt octoate since it causes the reaction to proceed quickly and it is available commercially at reasonable cost and at ready to use concentration levels. As noted above, the transesterification reaction was permitted to proceed in the extruder for about 3–5 minutes at a temperature of about 2500–280° C.

Under these conditions, the functionally-terminated polyolefin oligomer forms a copolymer with the polyester via transesterification. For understanding purposes, transesterification may be thought of as a reaction whereby the functionally-terminated polyolefin oligomer species are substituted for some of the former polyester monomeric species originally present in the starting polyester. Regardless of the mechanism, copolymer is formed for singly and multiply functionally terminated polyolefin oligomer species. When copolymer is made using the reactive extrusion process, the incorporation of the functionally terminated polyolefin oligomer usually forms a copolymer with a lower molecular weight than that of the starting polyester. This can be controlled to some extent by use of vacuum to remove any low molecular weight by-products from the condensation reaction. Again, regardless of the mechanism, some of the species encompassed by Formulas VI, VII and VIII above are incorporated as segments into a copolycondensate comprised predominantly of segments from the starting polyester often with the appearance that they were substituted for some of the original monomeric species encompassed by Formulas I and II above. For a more detailed discussion of the transesterification process, see Page 322 in the book "Advanced Organic Chemistry: Reactions, Mechanisms, and Structure" by Jerry March, McGraw-Hill, Inc., 1968. As will be demonstrated with data in the examples section of this disclosure, a true copolymer is formed under these conditions as opposed to a blend or mixture of starting components. Also, these copolycondensates typically exhibit only a single glass transition temperature in the range of about 65° C.

The copolycondensates formed via reactive extrusion as described above have only limited amounts of polyolefin oligomer segments which appear to exist as small areas dispersed throughout the predominantly polyester segments of the copolycondensate. The existence of small polyolefin oligomer segments dispersed throughout the copolycondensate is confirmed with electron microscopy data using $OsO_4$ staining as will be shown in examples presented later in this disclosure. Controlling the size of these polyolefin oligomer segments is important as it is necessary for these polyolefin oligomer segments to have cross sectional measurements (diameters) predominately in the range less than about 3000 Angstrom units when clarity is required as was previously disclosed. The desired size and the range of distributions of the sizes of the polyolefin oligomer segments can be achieved by controlling the reactants and the reaction conditions. Examples presented later in this disclosure will show the effect of various reactant and reaction parameters on oligomer segment size and segment size distribution.

As noted above the reaction temperature is maintained in the preferred range of about 250–280° C. with an especially preferred temperature range of 2600–270° C. The residence time in the extruder is maintained in the preferred range of about 3–5 minutes with an especially preferred time of about 4 minutes. While the amount of polyolefin oligomer segments in the copolycondensates is determined by the desired oxygen scavenging capacity, it is typically in the range of about 0.5 wt % to about 12 wt %. The preferred amount of polyolefin segments is in the range of about 2 wt % to about 8 wt %, and especially preferred is the range of about 2 wt % to about 6 wt % polyolefin oligomer segments. The molecular weight of the functionally terminated polyolefin oligomer employed can vary widely with a preferred range of about 100 to 10,000 and an especially preferred molecular weight range of about 1,000 to 3,000. A transition metal transesterification catalyst, such as a cobalt carboxylate, is also employed in the extruder in a catalytic amount. The preferred catalyst range is about 10 to 300 PPM with an especially preferred range of about 50 to 200 PPM. It should be noted that PET, as it is commercially available, commonly contains cobalt catalyst from its manufacture. The preferred transesterification catalyst is cobalt octoate.

When prepared via a reactive extrusion process in which pellets are formed and then stored, it is most desirable to control the amount of moisture uptake of the copolymer in order to minimize the need for drying prior to fabrication into packaging articles. Control of moisture uptake can be accomplished by a two step process. First the copolymer extrudate can be cooled using a non-aqueous submersion quench process prior to chipping into pellets as disclosed in U.S. Pat. No. 5,536,793. This process allows for the preparation of low moisture pellets. Next the pellets are sealed directly in moisture proof containers (e.g., cans) for storage.

The pellets may be used from storage directly in subsequent melt processing steps commonly employed in the packaging industry such as extrusion blow molding, film casting, sheet extrusion, injection molding, melt coating, etc. If drying is required, it is desirable to dry the pellets in a vacuum oven or in a desiccant oven which is blanketed with nitrogen.

In order to minimize loss of oxygen scavenger utility of the copolymer, the copolymer can be produced during the melt fabrication step used to make the packaging article. This is dependent on the flexibility of the fabrication process and is typically preferred for extrusion type processes such as form or sheet extrusion. As will be explained later, the copolymers are relatively safe from blatant oxygen attack once they are incorporated into a bottle or film.

In theory, it would be desirable to incorporate the largest possible amounts of functionally terminated polyolefin oligomer into the copolycondensates as this is the moiety which consumes oxygen and subsequently determines oxygen scavenging potential. However, there are other considerations which must be made including the desirability of largely retaining the salient properties of the starting packaging polyester. The sizes of the oligomer segments are widely varied and the copolycondensates produced usually contain some oligomer segments whose diameters are distributed outside the preferred diameter range of under about 3000 Angstrom units regardless of the controls employed. The range of under about 3000 Angstrom units is preferred because segments with diameters in this range have only a minimal effect on the transmission of visible light.

It has been found by applicants that deployment of the functionally terminated polyolefin oligomer in the range of about 0.5 wt % to about 12 wt % using molecular weights for the oligomers in range of about 1,000–3,000 will produce copolycondensate having the preferred polyolefin oligomer segment diameter size distribution predominantly under about 3000 Angstrom units. Further, these copolycondensates will generally have a clarity of at least 70% (at typical film thickness of about 1 to about 10 mils) of the precursor polyester. Also these copolycondensates will generally have an oxygen absorbing capacity of at least 0.4 cc of oxygen per gram of copolycondensate at temperatures in the range of from about 0° C. to about 60° C. using the method for determining scavenging capacity as described in the examples section of this specification.

When prepared by reactive extrusion, an additional reason to limit the amount of functionally terminated polyolefin oligomer is to avoid excessive drops in molecular weight of the copolymer as compared to the molecular weight of the starting polyester from which the polyester segments are derived. Copolymer formation by reactive extrusion and transesterification inevitably entails fracture of the polyester molecular chains during insertion of the polyolefin oligomer segments and lowering of the copolymer molecular weight below that of the original starting polyester. Subsequent fabrication steps can be handicapped by low melt strength of the copolymer. For applications not requiring clarity, loading of the functionally terminated polyolefin oligomer to levels in excess of 8 wt % are acceptable depending on end use application requirements associated with rigidity, process stability, and oxygen absorption.

As was previously noted, a principal use of these copolymers is in blown or molded beverage bottles. An intrinsic viscosity of about 0.5 is generally required for the oxygen scavenging copolymers to be suitable for processing into bottles. The preferred methods of use for these copolymers in bottles is either as a middle layer between two layers of unmodified polyester or an additive concentrate (blend) with unmodified polyester. Both of these embodiments serve to overcome any potentially low intrinsic viscosity considerations. Alternatively, when made by reactive extrusion, it may be desirable to modify the intrinsic viscosity of the copolymers. The intrinsic viscosity of the copolymers may be most advantageously modified by employing polycondensate branching agents. The preferred branching agents include trimellitic anhydride, aliphatic dianhydrides and aromatic dianhydrides. Pyromellitic dianhydride is the especially preferred branching agent because it reacts quickly and to completion with polycondensates and also because it is readily commercially available. When used, these branching agents are normally employed in the extruder in an amount sufficient to obtain the desired intrinsic viscosity of the copolycondensates, typically in amounts up to 5,000 PPM (0.5%) with a preferred range of 0 to 3,000 PPM. Alternatively, the copolycondensates of this invention can be prepared via direct continuous and/or batch techniques to higher molecular weights and intrinsic viscosity.

Other additives which may also be present in the copolycondensates of this invention include heat stabilizers, antioxidants, colorants, crystallization nucleating agents, blowing agents (when foam is needed), fillers, biodegradation accelerants, and the like. Few, if any, of these typical additives are used for bottle applications that require clarity. However, as will be appreciated by those of ordinary skill in the art, inclusion of such additives yields copolymers which are within the spirit of this invention. The copolymers of this invention are also suited for use in opaque applications such as rigid opaque crystalline copolycondensate trays which would contain low levels of crystallization nucleating agents such as polyolefins. Also, the copolymers of this invention could be used to make cellular structures where the copolymers would be foamed to a lower density serving to further reduce the cost of the container. For opaque applications, blends of the copolycondensates of this invention would be useful in selected packaging uses, and in such instances physical blends of the oxygen scavenging copolycondensates having very large polyolefin oligomer segments could be tolerated. Typically the blending of the copolymers of this invention would be with other polycondensates, especially polyesters. However, even immiscible blends could be appropriate for applications where clarity is not a concern.

When prepared by transesterification in a reactive extruder as described above, the copolycondensates of this invention are typically first pelletized and then processed into bottles or films. The preferred type of bottle wall or film construction comprises a three layered embodiment as shown in FIG. 1. While the embodiment of FIG. 1 may require special extrusion equipment, it is still preferred for the following reasons: (1) it creates a structure with a relatively thick layer of exposed polyester which serves as a good passive barrier to oxygen from air, (2) the inner layer in contact with the packaged material is also polyester which has a long history of usage and acceptance for packaging of consumable materials, (3) placing the copolycondensates of this invention between two layers of unmodified polyester with good passive barrier properties isolates the oxygen scavenging copolymers from direct contact with air or oxygen and preserves their oxygen scavenging ability to be applied only to oxygen which passes through the unmodified polyester layers, and (4) the copolycondensates and the unmodified polyester are of such similarity that they bond together when coextruded without the need for or use of a tie layer of adhesive.

The preferred three layer embodiment described above is most easily achieved by coextrusion of one layer of copolymer with the two layers of unmodified PET. The copolymer is so chemically similar to the unmodified PET that the three layers uniformly adhere to each other and form a monolithic structure upon cooling. No tie layer adhesives are required. However, even in the articles of manufacture of this invention where recycling is not important, additional non-polyester layers can be incorporated to improve adhesion, improve barrier properties, reduce costs, etc. It may be possible to achieve the preferred three layered embodiment by techniques other than coextrusion such as by coating with solutions or heat fusion of separate layers. Any method other than coextrusion may have disadvantages of (1) reduction of scavenging potential by unwanted and/or inadvertent exposure of the oxygen scavenging copolymers to air or oxygen; and (2) additional processing steps. For fabrication of bottles, joining the three layers by adhesives would work against the objective of recyclability unless the adhesive was PET-based or PET-compatible. For production of films and wraps, recyclability is not nearly as important a consideration yet as it is for bottles. In fact, for films, it may even be desirable to use layers of the copolymers of this disclosure in conjunction with layers of other materials such as polyethylenevinyl alcohol layers and polyolefin layers. While immediate coextrusion of these copolymers may be the most preferred use for them, other use options are also available. For example, the copolymers could be blended as a concentrate with other PET or polyester for film or bottle manufacture, or be used as an inner liner or layer in a multi-layer construction sense, for example, in packaging electronic components.

When desired for certain applications, methods are available to make the oxygen scavenging properties of these copolymers even more effective. For example an oxidation catalyst could be optionally added to the copolymer during the product fabrication stage. The presence of such a catalyst when employed in the range of about 10 to 2,000 PPM serves to facilitate the rate of oxygen uptake. The preferred catalysts are the multivalent transition metals such as iron and manganese. Cobalt is especially preferred.

The copolymers of this invention may be used in conjunction with other oxygen consuming systems. For example one embodiment for enhanced oxygen scavenging for fabricated products of this invention involves the optional inclusion of photoactivators (such as small amounts of benzophenone) in the fabricated products along with the copolymers of this disclosure. Fabricated products, such as bottles, containing the optional photoactive materials as well as the copolymers of this disclosure would be exposed to UV light sufficient to activate the photoactive materials toward oxygen uptake prior to use (i.e., filling with fruit juice, etc.) or shipment of the fabricated product.

In yet a different enhanced embodiment, additional oxygen scavenging materials are deployed within the package cavity along with the use of the copolymers of this disclosure which would comprise the packaging material. Normally, these additional oxygen scavengers would take the form of a sachet, especially for non-consumable oxygen sensitive materials such as electronic components. For consumable oxygen sensitive substances, the additional oxygen scavenging materials might take the form of a mat as is often used in butcher shops under a cut of meat or poultry. Since there is no need for clarity or rigidity on the part of these additional internal oxygen scavengers, it may be economically favorable to use substances which do not have clarity as a constraint resulting in copolymers which may be opaque. In these applications, the diameter of the oxygen scavenger copolycondensate polyolefin oligomer segments is not critical. There are also embodiments of this technique in which the additional oxygen scavenger employed is one which is an entirely different system than the copolycondensates of this invention.

In yet another enhanced embodiment, the copolymers of this disclosure are deployed as an internal can coating alone or along with known can coating polymers. In either situation, both passive and active oxygen barriers are present since the can itself is a passive oxygen barrier. In either case, the copolymers of this disclosure are prepared so as to comprise a thermoset resin, or resin blend, which could be spray coated onto the interior container walls. A sprayable resin could most easily be made by blending a small amount of a copolymer of this invention with a thermoset resin normally used for coating cans. It may be necessary to prepare the copolymer with a higher percentage of PBD oligomer segments than is used for clear copolymers so as to require only a minimal amount of the copolymer blended with the sprayable resin. The benefit of a can liner comprising an active oxygen scavenger is that it affords the opportunity to dissipate so called "head space oxygen". Head space oxygen is unwanted oxygen trapped in the container during the filling and sealing process.

As has been indicated in several instances already, recycle of the bottles fabricated using the copolymers of this disclosure is an important inventive aspect of this disclosure. Further, the fabricated bottles should be suitable for recycle with other polyester bottles without the need for any special processing such as delamination or depolymerization. A quick review of the materials present in the fabricated bottles of this invention shows how the recycle requirements have been met. FIG. 1 shows a cross section of the preferred bottle wall construction. In FIG. 1, layers 26 and 28 are comprised of unmodified packaging polyester ester such as PET. Exterior surface 24 is defined by the thicker layer of polyester and interior surface 22 (i.e, package or bottle cavity) is defined by the thinner layer of polyester. Middle layer 30 is comprised of the oxygen scavenging copolymers of this invention. For a typical individual serving juice bottle of approximately one half liter capacity, the oxygen scavenging copolymer layer of the bottle represents about 5% by weight of the entire bottle. The remaining 95% of the bottle is unmodified polyester, normally PET. Under the heavier loading conditions of the copolymer with about 12% polyolefin oligomer, the copolymer layer is still 88% by weight PET segments and is typically 96% by weight PET when the more preferred percentages of polyolefin oligomer segments are employed. This means the final fabricated bottle is at least 99.4 weight percent PET and typically 99.8 weight percent PET. It is this high weight percentage of PET in the fabricated bottle which renders it suitable for recycle with other PET or polyester bottles.

Primary application for the oxygen scavenging copolymers of this disclosure will be for fabrication into packaging wails and packaging articles previously recited in several instances in this disclosure. A major use for these fabricated articles comprises the packaging of perishable foods and perishable items. A non-limiting list of perishable foods particularly amenable to the packaging described in this disclosure would include dairy products such as milk, yogurt, ice cream and cheeses, prepared foods such as stews and soups, meat products such as hot dogs, cold cuts, chicken and beef jerky, single serve items such as pre-cooked meals and pre-cooked side dishes, ethnic offerings such as pasta and spaghetti sauce, condiments such as barbecue sauce, ketchup, mustard and mayonnaise, beverages such as fruit juice, wine and beer, dry foods such as dried fruits, dried vegetables and breakfast cereals, baked goods such as bread, crackers, pastries, cookies and muffins, snack foods such as candy, potato chips and cheese-filled snacks, spreads such as peanut butter, peanut butter and jelly combinations, jams and jellies, and seasonings either dried or fresh. Generally, the disclosed copolymers and packaging made therefrom can be used to enhance the barrier properties in packaging materials intended for any type of product, whether it be food, beverages or otherwise, which degrades in the presence of oxygen.

EXAMPLES

COPOLYMER PREPARATION

The copolymers referenced in all subsequent examples, unless otherwise indicated, were prepared in the manner as herein described. A ZSK-30 extruder was equipped with a loss-in-weight PET pellet feeder under a nitrogen blanket. The hydroxy terminated polybutadiene was maintained in a viscous fluid vessel from which it was separately conveyed via a positive displacement pump to a vacuum suction port on the extruder line. PET was extruded at a feed rate of about 8 pounds per hour affording a residence time of approximately 4 minutes while maintaining the temperature in the range of 260 to 270° C. The hydroxy terminated polybutadiene (Elf Atochem RLM20—MW of 1230 or RHT45—MW of 2800) was pumped to the extruder at variable rates to afford weight percentages in the range of 2% to 8% for the hydroxy terminated polybutadiene in the extruder mixing zone. Melt seal designs were used to affect a vacuum zone following the mixing zone prior to the die opening. The extrudates were dry and non-smoking, and were easily pelletized following quench cooling in a water bath. No surface film (hydrocarbon slick) whatsoever could be seen in the water bath, indicative of copolymer formation by transesterification during reactive extrusion. The appearance of a film in the water bath would have indicated the presence of unreacted polyolefin oligomer. Cobalt octoate (Hulls Nuodex® D.M.R. cobalt 6%) was employed at a treatment rate sufficient to afford 50 PPM of Co when the hydroxy terminated polybutadiene was used at 2 weight % and 200 PPM of Co when the hydroxy polybutadiene was used at 8 weight %. Inclusion of the cobalt octoate did not adversely effect the clarity of the copolymers prepared. To the extent that it was measurable, cobalt containing copolymers appeared to have slightly improved clarity. The extrudates prepared as described were characterized as copolymers by several analytical techniques as described in Examples 1 to 11. All copolymers prepared by the method described above had single glass transition temperatures ($T_g$) in the range of 62.0° C. to 72.9° C. All copolymers prepared by the method described above were suitable for melt processing and capable of processing into bottles according to the preferred three layer bottle wall embodiment. In the following examples, all data relating to oxygen scavenging capacity was taken at either 22° C. or 60° C. which is below the glass transition temperature of the copolymers of this invention.

EXAMPLES 1 TO 8

Examples 1 to 8 are shown in Table 1 and relate the inherent viscosity (I.V.) losses encountered as expected from the transesterification formation of the copolycondensates by reactively extruding a mixture of PET and hydroxy terminated PBD oligomers. The I.V. values in Table 1 are expressed in deciliters per gram (dl/g). The I.V. was measured by the technique of inherent viscosity of polyesters and polyamides based on ASTM method D2857 and the solvent used was a 60/40 blend of phenol/1,1,2,2,-tetrachloroethane. The low molecular weight (LMW) PBD oligomers, having a higher content of hydroxy end groups, shifted the I.V. further from the starting value of 0.67 for PET than the high molecular weight (HMW) PBD oligomers at the same loading level. Gel permeation chromatography (GPC) data taken for Examples 2, 3, 6 and 7 (data are not shown) confirmed shifts in the entire molecular weight distribution corresponding to the shifts in I.V predicted by the Mark-Houwink Equation which relates molecular weight to I.V. Only formation of a true copolymer via transesterification could produce such a result. The PET used for the two control examples and also used in forming the copolycondensates was Shell Clear Tuf® 7207.

Figure 2:
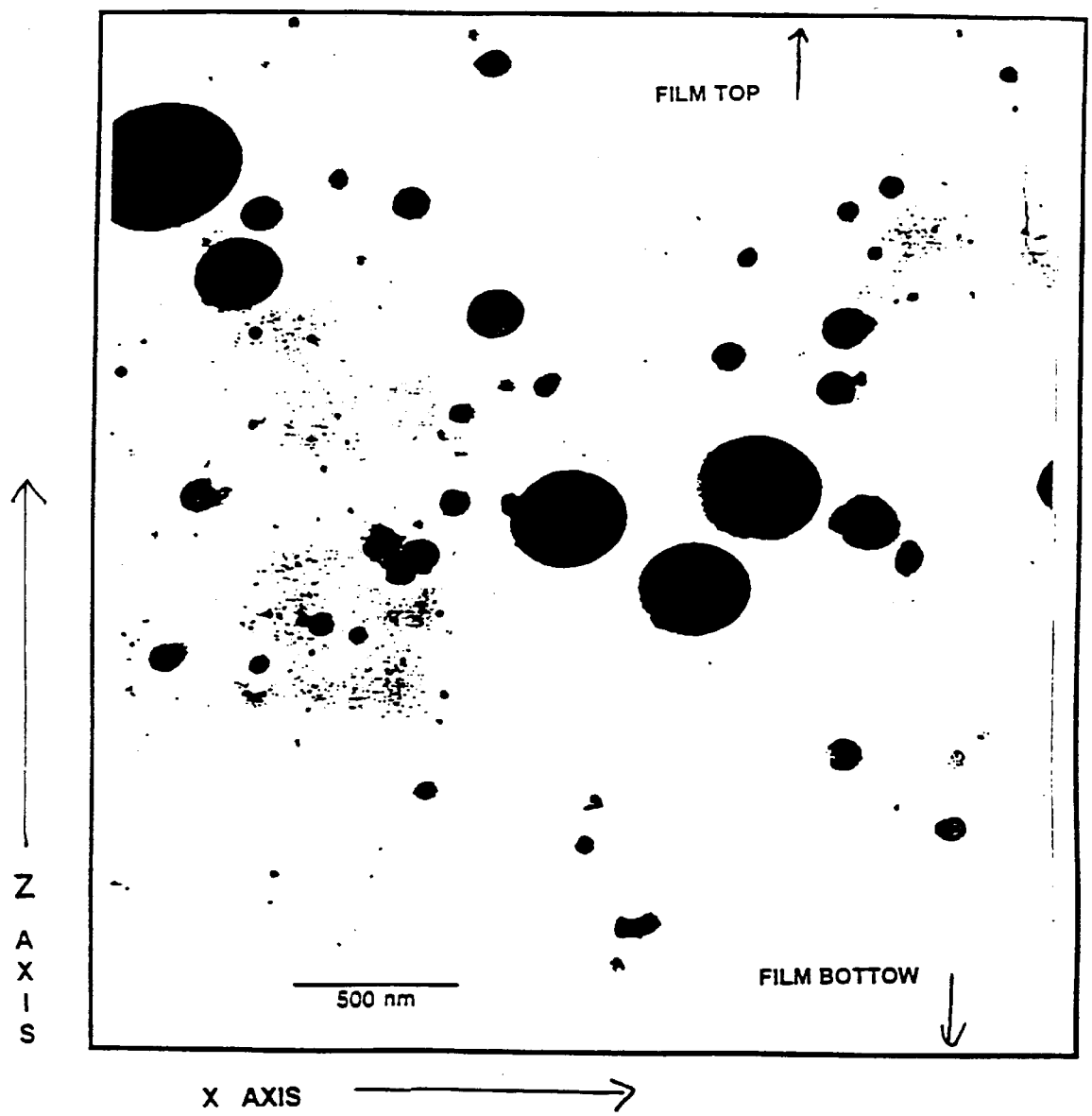
FIG. 2 is a copy of a photomicrograph at 60,000 magnification of a cross sectional cut of a copolymer film of this invention which shows the polyolefin oligomer segments of the copolymer that have been stained with $OsO_4$.

A transmission electron microscope (TEM) photomicrograph at 60,000 magnification of a sample which was prepared identically to the copolymer of Example No. 5 is shown in FIG. 2. The copolymer was stained with $OsO_4$ which darkens only the polyolefin oligomer segments of the copolymer. The approximate size and distribution of the polyolefin oligomer segments are easily discernible.

TABLE 1

INHERENT VISCOSITY SHIFT-EXAMPLES 1 TO 8

| Example No. | HISTORY/ CHARACTERIZATION | INHERENT VISCOSITY |
|---|---|---|
| 1 | PET (control) extrusion feedstock | 0.67 |
| 2 | PET (control) extrudate | 0.65 |
| 3 | 2% LMW hydroxy PBD in PET | 0.53 |
| 4 | 2% LMW hydroxy PBD in PET, 2nd extruder pass | 0.49 |
| 5 | 4% LMW hydroxy PBD in PET | 0.48 |
| 6 | 2% HMW hydroxy PBD in PET | 0.62 |

TABLE 1-continued

INHERENT VISCOSITY SHIFT-EXAMPLES 1 TO 8

| Example No. | HISTORY/ CHARACTERIZATION | INHERENT VISCOSITY |
|---|---|---|
| 7 | 2% HMW hydroxy PBD in PET, 50 PPM Cobalt | 0.61 |
| 8 | 8% HMW hydroxy PBD in PET, 200 PPM Cobalt | 0.50 |

EXAMPLES 9 TO 11

Figure 3:
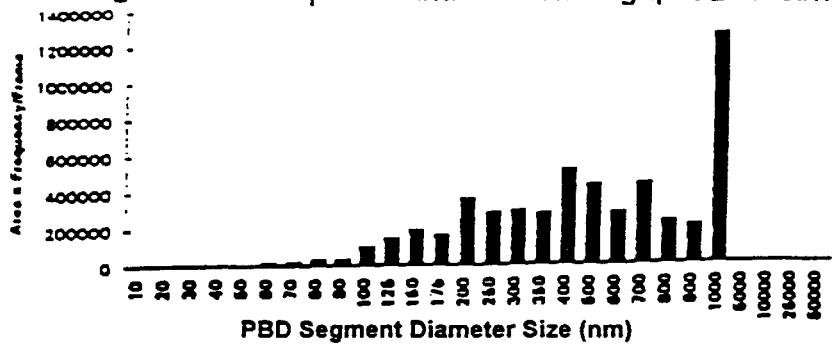
FIGS. 3–5 are graphs which show the distribution of the diameter sizes of the polyolefin oligomer segments of the copolymers as determined by transmission electron microscopy.
Figure 4:
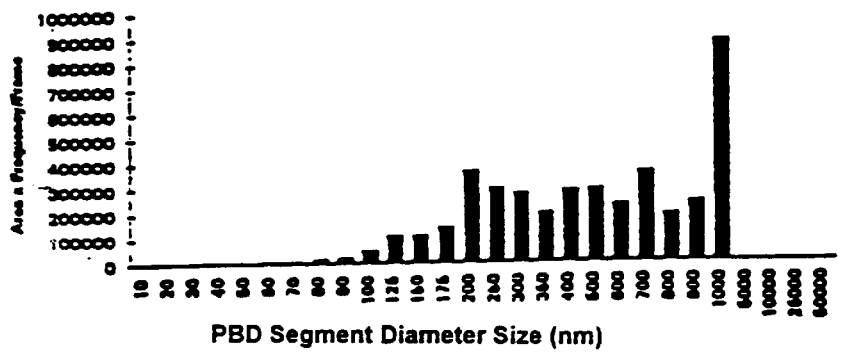
Figure 5:
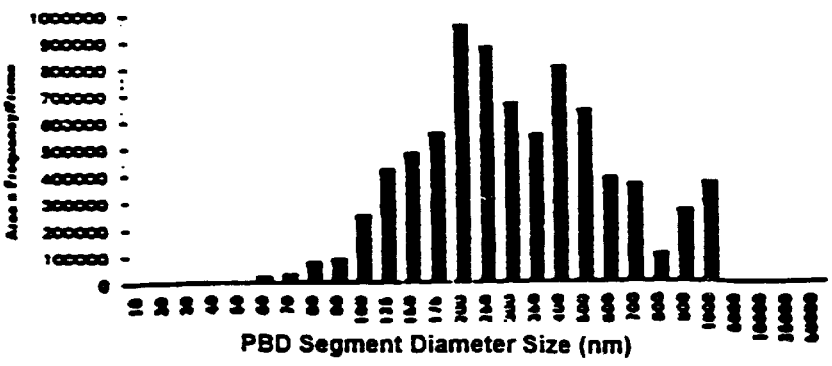

FIGS. 3 to 5 cover Examples 9 to 11 respectively and show data obtained by transmission electron microscope (TEM) technology. What is shown are the distribution of polyolefin oligomer segment sizes for the condensation copolymers of this invention. The copolymers had been stained with $OsO_4$ which adds color to the unsaturated polyolefin oligomer segments only. The copolymer of Example 11 was prepared in the manner as described above. The copolymers of Examples 9 and 10 were prepared in a manner similar to that described above except that the extrusion rate was 20 lbs./hr for Example 9 and 12 lbs./hr. for Example 10. The three examples show the effect on polyolefin oligomer segment size distribution at three different PET extrusion rates of 20 lbs./hr., 12 lbs./hr., and 8 lbs./hr. These extrusion rates afforded extrusion residence time of about 3 to 5 minutes. In all three cases, 4% hydroxy terminated PBD (MW about 1230) was extrusion copolymerized with PET.

For each of the copolymers of Examples 9–11, sixteen photomicrograph plates at 60,000 magnification were prepared similar to the partial plate of FIG. 2. FIG. 2 shows a cross section cut of a film of copolymer prepared identically to that of Example 5. All sixteen frames for each of Examples 9, 10, and 11 (which were also cross sections of sheets as In FIG. 2) were then subjected to an automated process which first estimated an average diameter for each segment in each plate and then subsequently calculated an average cross sectional area for each segment in the plate on the assumption that each segment approximated a circle. The process also collected the segments of similar size into groups covering a convenient wave length range and tallied the number of segments which fell into each grouping. The wave length range for the groupings was larger at longer wave lengths so as to accommodate an exponential display of segment sizes. For each graph of FIGS. 3–5, the X axis shows average diameter size (by groups) of the polyolefin segments in nanometers (nm, $1\times10^{-9}$ meters). One nm is equal to about 10 Angstrom units, e.g., 300 nm is equivalent to about 3000 Angstrom units. The Y axis of FIGS. 3–5 shows the area of the segments (in square nm) multiplied by the number of segments of that area, i.e., (the number in each group) per frame It is convenient to characterize segment size distributions using such bar graphs and also to sum up the total length of all the bars in any given graph. For this invention, when the sum of the length of all the bars at 300 nm or less exceeds 50% of the sum of the total of all bars, the segment size distribution is considered to be predominately under 300 nm (3000 Angstrom units). As previously disclosed, it is preferred that the polyolefin segment size distribution be predominantly (as defined above) under 3000 Angstroms units when clarity is an important property required of the copolymers of this invention. Generally, segment sizes larger than about 1,500 nm would not scatter significantly visible light (i.e., interfere with clarity) and were ignored in the above considerations and calculations.

As can be seen from these examples, more favorable distribution of the copolymer polyolefin oligomer segment sizes (i.e., predominantly smaller diameters which would not interfere with visible light generally considered to be in the range of about 400 nm to about 800 nm) occurs at the lower extruder throughput rates. Based on these results a similar effect would be expected for the higher molecular weight hydroxy terminated PBD (MW about 2800) i.e., slower throughput rate (longer residence time) would produce more favorable polyolefin oligomer segment diameter size distributions with predominately smaller diameters that do not interfere with visible light.

EXAMPLES 12 TO 15

Figure 6:
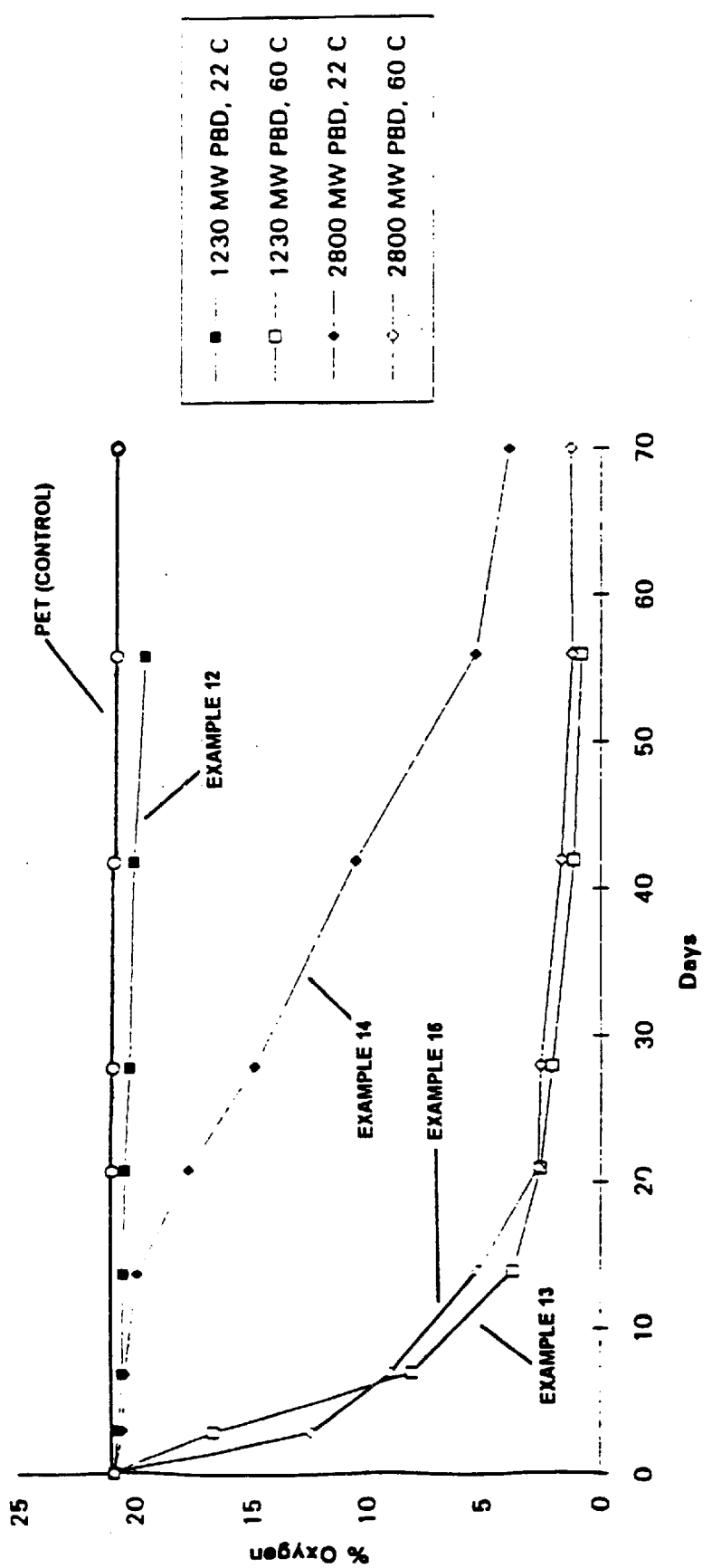
FIG. 6 is a graph which demonstrates the oxygen scavenging capacity of the copolycondensates of this invention at two polyolefin oligomer molecular weights versus unmodified polyester.

Data for Examples 12 to 15 may be found in FIG. 6. These four examples show the oxygen scavenging capacity of the copolymers of this invention at two PBD MW values and at two temperatures. Example 12 is data for a biaxially oriented film of 2 mil thickness constructed from a copolymer of 4% hydroxy terminated PBD (PBD MW about 1230) and PET extruded at a throughput rate of about 8 lbs. per hour. Also, for Example 12, 10 grams of copolymer film were placed in contact with 500 cc of air and the percent oxygen in the air was monitored with a Mocon HS750 analyzer unit over a period of days at 22° C. For Example 13, all parameters were the same as for Example 12 except that the test was run at 60° C. Example 14 was the same as Example 12 except the PBD MW was about 2800. Example 15 was the same as Example 14 except that the test was run at 60° C. As can be seen from the graph in FIG. 6, the 2800 MW PBD is a much more effective oxygen scavenger than the 1230 MW PBD at an ambient temperature of 22° C. even though both examples were at the 4% PBD level. The degree of biaxial orientation imparted to all of Examples 12 to 15 was an elongation of the sheets of 2.5 times in one direction of the plane of the sheet (e.g., along x axis in FIG. 2) and 4.0 times in a direction of the plane of the sheet 90 degrees from the 2.5 stretch (e.g., y axis in FIG. 2). This degree of biaxial orientation is common in the bottling industry and frequently referred to as the 2.5×4.0 biaxial orientation.

Also shown in FIG. 6 are data for a control sample consisting of 25 grams of unmodified PET in the form of pulverized pellets maintained at 60° C. The unmodified PET control showed no oxygen scavenging capacity whatsoever at 60° C.

EXAMPLES 16 AND 17

Figure 7:
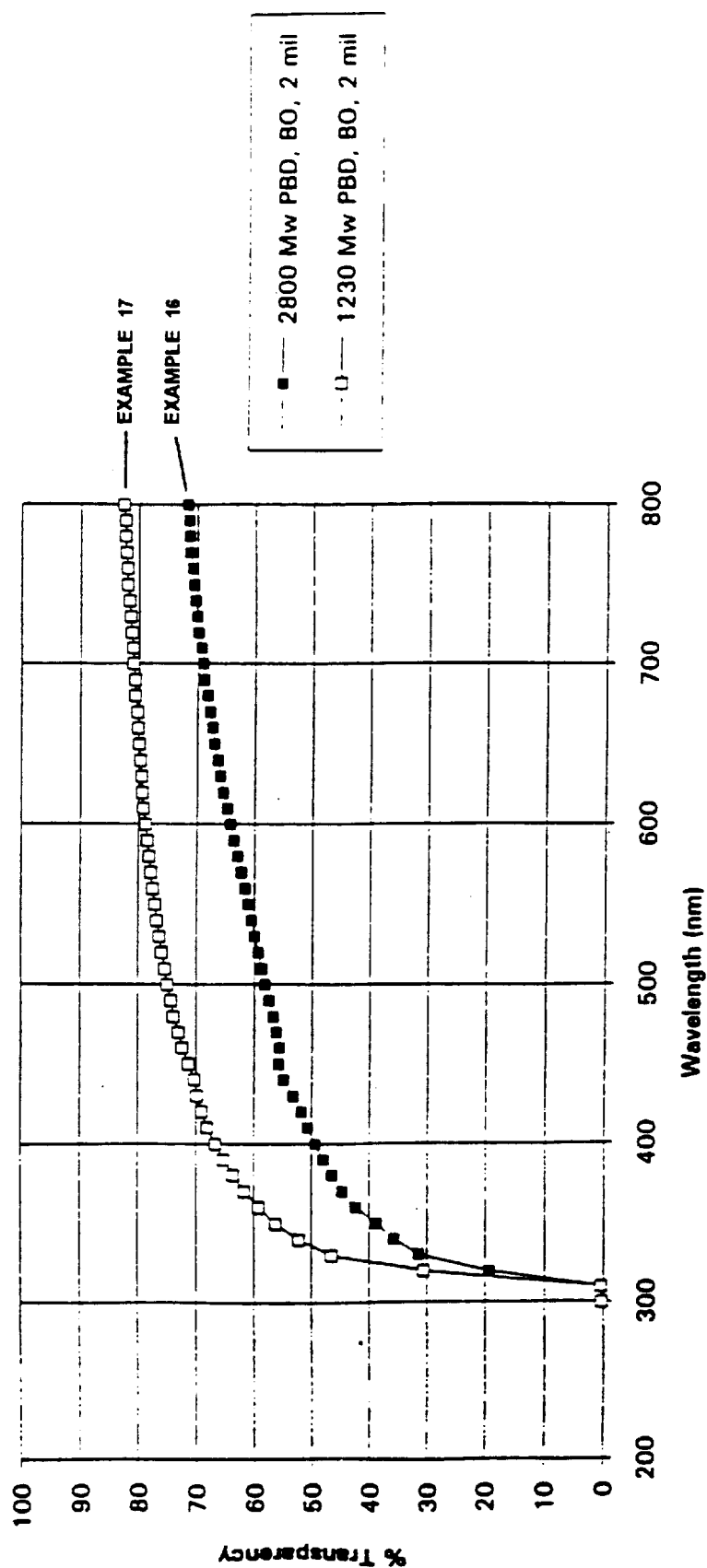
FIG. 7 is a graph which shows the effect of the molecular weight of the polyolefin oligomer on copolymer clarity.

In addition to oxygen scavenging capacity at room temperature, the PBD molecular weight also has an effect on the absolute transparency/clarity of the copolymers. FIG. 7 shows data for Examples 16 and 17. Example 16 was a 2 mil thickness biaxially oriented (2.5×4.0 biaxial orientation) sheet of copolymer comprising of PET and 4% PBD of 2800 molecular weight. Example 17 was the same as Example 16 except that the PBD molecular weight was 1230. The clarity measurements in terms of percent transmission of light for various wave lengths of light energy were measured on a Shimadzu UV-160 spectrophotometer. There was enhanced clarity for the lower molecular weight PBD of Example 17 at all wavelengths indicating that when clarity is an important consideration, it may be necessary to balance the enhanced oxygen scavenging capacity of the higher molecular weight PBD versus the better light transmission properties of the lower molecular weight PBD.

EXAMPLES 18 AND 19

Figure 8:
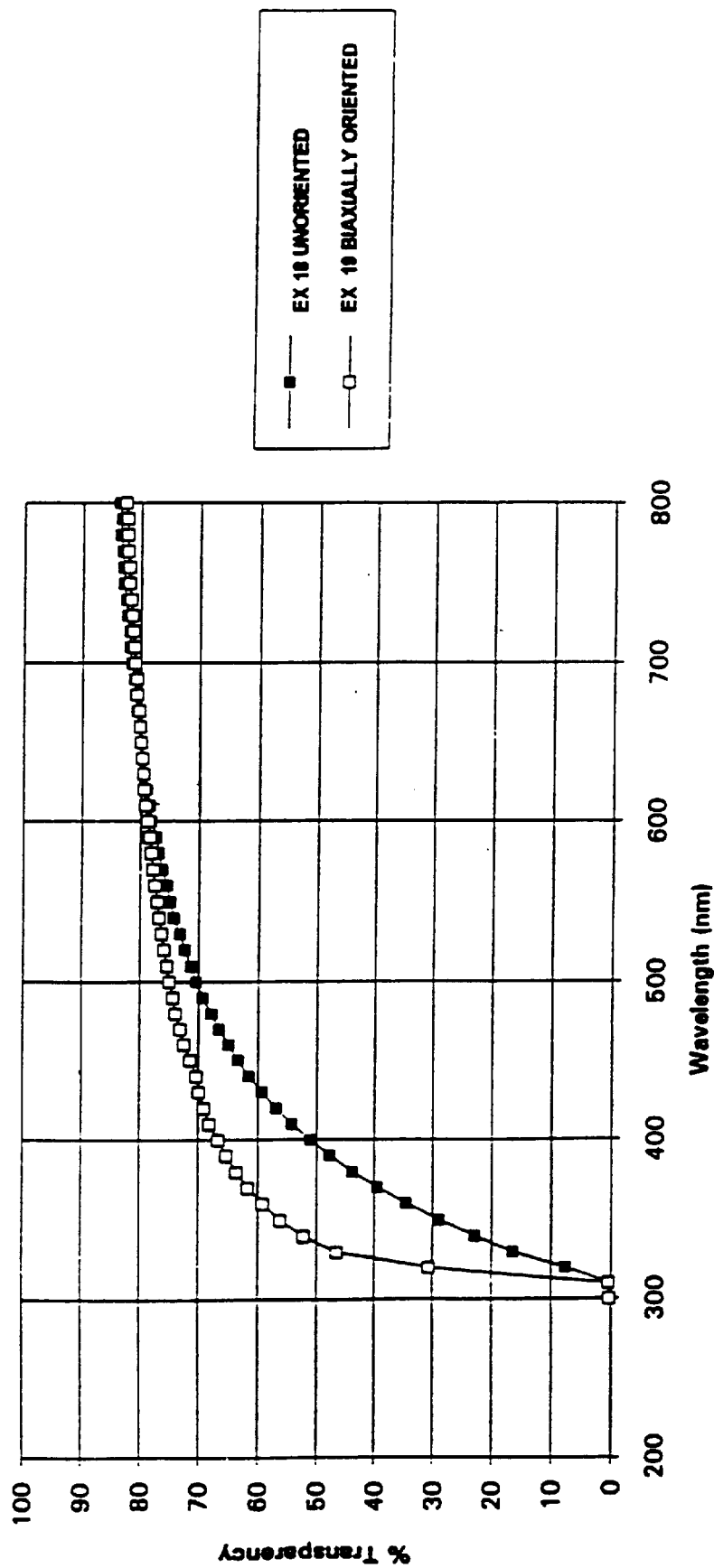
FIG. 8 is a graph which compares the clarity of films of the PET copolymers of this invention in an unoriented versus biaxially oriented mode.

Clarity of the copolymers of this invention when used in film sheets was also affected by the degree of orientation imparted to the film sheets. Data for Examples 18 and 19 are shown in FIG. 8. The clarity measurements in terms of percent transmission of light for various wave lengths of light energy were measured on a Shimadzu UV-160 spectrophotometer. Example 18 was for a 2 4 wt % PBD segments of 1230 molecular weight. The sheet for Example 18 was totally unoriented. Example 18 was prepared identically to the copolymer earlier used for Example 5 and also shown in FIG. 2. Example 19 was identical to Example 18 except that the film sheet for Example 19 was biaxially oriented (2.5×4.0 biaxial orientation) and was selected so as to be 2 mil thick after the biaxial stretch. The biaxially oriented film of Example 19 showed improved clarity particularly- in the 400 to 700 nm wavelength range. A complete explanation and accounting for the reasons that the biaxially oriented film was more transparent than un-oriented film is difficult in that there are a number of competing factors involved. The cross sectional diameters of the polyolefin segments increases along both the x and y axes (see FIG. 2) but the cross sectional size in the direction of the z axis, which is also the direction of light travel, actually decreases from the biaxial stretch. It is believed by applicants that this diminishment of the segment diameters in the direction of light travel shifts the segment size distribution even more predominately under 3000 Angstrom units. It is further believed that the larger size of the segment diameters along the x and y axes after the biaxial stretch has little effect on the scattering of light.

EXAMPLES 20 TO 22

Clarity of the copolymers of this invention is an important consideration for bottle construction, especially in terms of the clarity of the copolymer when compared to unmodified polyester. Example 21 in FIG. 9 shows clarity measurements in terms of percent transmission of light for various wave lengths of light energy as measured on a Shimadzu UV-160 spectrophotometer. Example 21 was a 2 mil thick biaxially oriented film (2.5×4.0 biaxial orientation) of a copolymer which was 96 wt % PET and 4 wt % PBD of 1230 molecular weight extruded at 8 lbs./hr. Example 20 was a control consisting of unmodified PET also used in the form of a 2 mil thick 2.5×4.0 biaxially oriented film. As can be seen from the data, the clarity of the copolymer for visible light (generally considered to be 400 to 800 nm) was at least 70% the clarity of the unmodified PET. Example 22 was a theoretical calculation for the percent light transmission predicted of the copolymer at a thickness of 1 mil and was included to show predicted clarity at the low end use level in terms of bottle wall thickness.

EXAMPLES 23 TO 26

Inclusion of a transition metal catalyst in the copolymers of this invention dramatically influenced the rate at which oxygen was scavenged. The data associated with Examples 23 to 26 are presented in Table 2 and clearly show this effect. Examples 23 to 26 were prepared in the manner described above except that they were samples taken from a larger pilot plan run and were not subjected to water quench. Instead, after exiting the extruder, the copolymer was laid on a Sandvik metal belt for cooling prior to chopping/pelletizing. The copolymer for Examples 23 to 26 was made by extrusion copolymerization using 4 wt % PBD of MW about 1230 and 96 wt % PET. The pellets were contained in heat-sealed foil bags for storage prior to use. The pellets were ground prior to compression molding into 20 mil thickness sheets which later were biaxially stretched in the same manner as described in prior examples into 2 mil thickness sheets. For Examples 24 and 26, Huhls Nuodex® D.M.R. (cobalt 6%) catalyst dissolved in mineral spirits was added to the ground copolymer in sufficient quantity to achieve 150 PPM of cobalt. No cobalt was added to Examples 23 and 25. For all of Examples 23 to 26, 10 grams of 2 mil thickness biaxially oriented film was exposed to 500 cc of air with periodic monitoring of the percent oxygen remaining in the 500 cc air sample using a Mocon HS750 analyzer.

The results obtained for these four examples are shown in Table 2 which follows. Examples 23 (no cobalt) and 24 (150 PPM cobalt) were run at room temperature of 22° C. and should be compared with each other to see the effect of the presence of cobalt. Note the data for Day 42 which shows only 3.98% oxygen remaining with cobalt (Example 24) versus 19.9% oxygen remaining for the same copolymer without cobalt (Example 23). Also for Day 42, the oxygen scavenged with cobalt was 8.3 cc per gram of copolymer versus only 0.4 cc of oxygen scavenged per gram of copolymer without cobalt. It should be noted that the value 0.4 cc of oxygen per gram of copolymer appears to barely make the threshold requirement, but the value was about the same as that found at 22° C. for a commercially available oxygen scavenger used without cobalt (see Example 27). A similar effect was seen when Examples 25 (no cobalt) and 26 (150 PPM cobalt) are compared but the improvement by adding cobalt was not as dramatic because of the increased oxygen scavenging rate of the copolymer at 60° C. even without cobalt.

FIG. 10 shows the data of Table 2, below, corresponding to Examples 23–26 in graphical format.

TABLE 2

EFFECT OF COBALT ON COPOLYMER OXYGEN SCAVENGING

|  | EX. 23 | EX. 24 | EX. 25 | EX. 26 |
|---|---|---|---|---|
| TEMPERATURE, ° C. | 22 | 22 | 60 | 60 |
| DAY 0-PERCENT $O_2$ | 20.9 | 20.9 | 20.9 | 20.9 |
| DAY 3-PERCENT $O_2$ | 20.7 | — | 16.6 | — |
| DAY 7-PERCENT $O_2$ | 20.5 | 11.8 | 8.02 | 5.84 |
| DAY 14-PERCENT $O_2$ | 20.4 | 9.49 | 3.67 | 1.42 |
| DAY 21-PERCENT $O_2$ | 20.3 | 7.41 | 2.49 | 0.646 |
| DAY 28-PERCENT $O_2$ | 20.1 | 5.32 | 2.02 | 0.478 |
| DAY 42-PERCENT $O_2$ | 19.9 | 3.98 | 1.09 | 0.06 |
| DAY 42-$O_2$ UPTAKE IN CC/GRAM | 0.4 | 8.3 | 9.3 | 10.3 |

EXAMPLES 27 TO 30

The data for Examples 27 to 30 are displayed in graphical format in FIG. 11. Examples 27 to 30 demonstrate the superior oxygen scavenging ability of the copolymers of this invention versus a commercialized system often referred to as the Carnaud Metalbox (CMB) OxBar System. The CMB oxygen scavenging system comprises a blend of about 96% PET and about 4% of poly(m-xyleneadipamide) which is a polyamide made from equimolar amounts of the two monomers (1) metaxylene diamine and (2) adipic acid. This polyamide is frequently designated as MXD-6. U.S. Pat. No. 5,021,515 discloses CMB's OxBar oxygen scavenging system in detail. Example 29 was prepared as 4 weight percent MXD-6 blended with 96 weight percent PET and also containing 200 PPM cobalt which is a preferred method of use according to U.S. Pat. No. 5,021,515. This CMB polymer blend was tested for oxygen uptake in the manner similar to that given for Examples 23 to 26 above, i.e., 10 grams of 2 mil thickness biaxially oriented film were exposed to 500 cc of air with periodic monitoring of the percent oxygen remaining in the 500 cc air sample using a Mocon HS750 analyzer. The CMB blend designated as Example 27 was tested at 22° C. When the calculations were made, Example 27 had an oxygen scavenging capacity of 0.41 cc of oxygen per gram of copolymer at 22° C. in the absence of cobalt. Example 28 was the same as Example 27 except that it was tested for oxygen uptake at 60° C. Examples 29 and 30 were copolymers of this invention both comprising predominantly PET segments and 4% PBD of molecular weight 1230 with 150 PPM of cobalt present. Example 29 was tested for oxygen uptake at 22° C. and Example 30 was tested at 60° C. The examples using the copolymers of this invention had less cobalt (150 PPM) than the PET/MXD-6 system which had 200 PPM of cobalt. Also, a less effective oxygen scavenging PBD molecular weight of 1230 was used (see Examples 12 to 15 in FIG. 6) for the copolymers of this invention. In spite of these factors which favored the PET/MXD-6 system, the copolymers of this invention were far superior in terms of oxygen uptake at both temperatures tested as can easily be discerned from the graphs in FIG. 11.

EXAMPLES 31 AND 32

Examples 31 and 32 demonstrate unexpected and surprising results obtained regarding the oxygen scavenging capacity and efficacy of the copolymer compositions of this invention. It was noted earlier in this specification that applicants believed that substances having secondary and tertiary hydrogen atoms would make good candidates for oxygen scavenging. Before it was selected as a preferred oxygen scavenging hydrocarbon, tests and calculations were made to discern the intrinsic oxygen scavenging ability of oligomeric PBD and also to estimate its theoretical thermodynamic oxygen scavenging capacity. Example 31 (two separate runs of identical samples) consisted of 0.4 grams of hydroxy terminated PBD of MW 1230 which was heated to about 270° C. under a nitrogen atmosphere and held at that temperature for about 4 minutes as an emulation to extrusion. Example 32 (three separate runs of identical samples) consisted of 10 grams of a copolymer of this invention comprising predominantly PET segments and 4 wt % PBD (MW about 1230) segments. For each of the three samples of Example 32, 10 grams of copolymer were used which at the 4% loading level provided the same amount of PBD as in Example 31, i.e., 4% of 10 grams of copolymer afforded 0.4 grams of oligomeric PBD. All five samples of Examples 31 and 32 were placed in 500 cc containers, sealed off from the environment, and then maintained at 60° C. over a period of days. During this time the percent oxygen of the air inside each of the sealed containers was monitored with a Mocon HS750 analyzer unit and periodically recorded. The results are shown in FIG. 12. The same amount (weight) of hydroxy terminated PBD was dramatically more effective as an oxygen scavenger after it was converted to segments of a copolymer than when used as a viscous fluid. This was unrefutable evidence which showed that incorporation of the hydroxy terminated PBD into a copolyester yielded a useful composition and provided a very effective medium which enhanced the oxygen scavenging ability of the hydroxy terminated polyolefin oligomer substantially beyond its capacity as commercially available. In FIG. 6 it was noted that PET had absolutely no oxygen scavenging capacity whatsoever. Example 31 demonstrated that the hydroxy terminated PBD was a poor oxygen scavenger when used as commercially available. Thus, neither of the two starting materials, PET and hydroxy terminated PBD, were potent scavenging substances. However, when the two starting materials were formulated into the copolymers of this invention, the result was a truly outstanding composition capable of scavenging oxygen at capacities and rates required for commercial application. Regardless of the reason for such behavior of the starting materials, the full thermodynamic oxygen scavenging potential of the oligomeric PBD was realized only after it was made into a copolycondensate of this invention.

Examples 1 to 32 above illustrate the improved properties of the compositions disclosed, methods of preparing the compositions, and utility of the compositions and are not intended to limit the scope of the invention as defined herein. It will be understood by those of ordinary skill in the art that the oxygen scavenger compositions will be useful in a great variety of packaging constructions which, in spite of variations in resin composition, layer configuration, end use, or other aspects, will nevertheless embody and benefit from the present invention. Further, while only copolyesters have been exemplified in this specification, those of ordinary skill in the art will appreciate that the oxygen scavenging polyolefin oligomers which are functionally terminated with polycondensation end groups could easily be incorporated into other copolycondensates such as copolyamides, copolyimides, copolysulfones, copolyols, copolyethers, copolyketones, etc., affording oxygen scavenging properties to these additional copolycondensates prepared thereby.

We claim:

1. A process for preparing polycondensation copolymers capable of absorbing oxygen comprising predominantly polyester segments and an oxygen scavenging amount of unhydrogenated polyolefin oligomer segments comprising the steps of:
    (a) providing an extruder having a heated mixing zone, at least one inlet port to the mixing zone, and an exit die opening;
    (b) feeding polyester and a transesterification catalytic amount of a transition metal carboxylate via an inlet port into the heated mixing zone of the extruder;
    (c) conveying an oxygen scavenging unhydrogenated polyolefin oligomer into the extruder mixing zone via an inlet port at a rate sufficient to impart oxygen scavenging capacity to the copolymer formed, wherein said polyolefin oligomer is at least singly functionally terminated with end groups capable of entering into polycondensation reactions;
    (d) mixing and heating the polyester, the carboxylate, and the polyolefin oligomer under an inert atmosphere at a temperature, and for a residence time in the mixing zone, sufficient to melt the polyester and cause it to react with the functionally terminated polyolefin oligomer to form polycondensation copolymer via transesterification; and
    (e) conveying the copolymer to the extruder exit die opening and extruding the copolymer therefrom.

2. The method of claim 1 wherein the polyolefin oligomer is selected from the group consisting of polypropylene, poly(4-methyl)1-pentene, polybutadiene, and mixtures thereof.

3. The method of claim 1 wherein the polyolefin oligomer comprises polybutadiene.

4. The method of claim 1 wherein the functionally terminal end groups are selected from the group consisting of hydroxy, carboxy, amino, and mixtures thereof.

5. The method of claim 1 wherein the polyolefin oligomer has a molecular weight in the range of about 100 to about 10,000.

6. The method of claim 1 wherein the polyolefin oligomer has a molecular weight in the range of about 1,000 to about 3,000.

7. The method of claim 1 wherein the polyolefin oligomer comprises from about 0.5 to about 12 wt % of the mixture in the extruder.

8. The method of claim 1 wherein the polyolefin oligomer comprises from about 2.0 to about 8 wt % of the mixture in the extruder.

9. The method of claim 1 wherein the temperature in the extruder mixing zone is maintained in the range of about 250° C. to about 280° C. and the residence time in the mixing zone is in the range of about 3 to about 5 minutes.

10. The method of claim 1 wherein the extruder further comprises a vacuum zone between the mixing zone and the exit die and the copolymer is transported through said vacuum zone thereby removing any volatile components.

11. The method of claim 1 wherein the transition metal carboxylate is introduced into the extruder mixing zone along with the polyolefin oligomer instead of with the polyester.

12. The method of claim 1 wherein the transition metal carboxylate is separately introduced into the extruder mixing zone.

13. The method of claim 1 wherein the copolymer comprises polyester segments derived from the group consisting of PET and PEN.

14. The method of claim 13 wherein the functionally terminated polyolefin oligomer is hydroxy terminated polybutadiene having a molecular weight in the range of about 1,000 to about 3,000 deployed in the range of about 2 wt % to about 8 wt % of the mixture in the extruder and the transesterification catalyst is cobalt octoate deployed in the range of about 10 to about 300 ppm.

15. A composition made by a process comprising the steps of:
   a) introducing into a heated mixing zone of an extruder, in any sequence, a polyester resin, an amount of oxygen scavenging unhydrogenated polyolefin oligomer effective to impart oxygen scavenging capacity to the composition, wherein the polyolefin oligomer is at least singly terminated with a functional end group, and a transition metal catalyst;
   b) mixing and heating the transition metal catalyst, the polyester and the polyolefin oligomer at a temperature and for a residence time in the mixing zone effective to melt the polyester and enable it to at least partially undergo a polycondensation reaction with the functionally terminated polyolefin oligomer; and
   c) cooling the mixture to provide a solid, melt processible composition having an oxygen absorbing capacity of at least 0.4 cc of oxygen per gram of composition at temperatures in the range of about 4° C. to about 60° C.

16. The composition of claim 15 wherein a branching agent is introduced into the heated mixing zone of the extruder in an amount effective to increase the melt strength of the composition.

17. The composition of claim 16 wherein the composition has an intrinsic viscosity of at least about 0.5 deciliters/gram.

18. The composition of claim 16 wherein the branching agent is in an amount of up to about 5,000 PPM with respect to the weight of the composition.

19. The composition of claim 18 wherein the branching agent is pyromellitic dianhydride.

20. The composition of claim 15 wherein the process further comprises the step of recovering the composition in pellet form.

21. The composition of claim 15 wherein a transition metal catalyst is introduced into the heated mixing zone of the extruder in an amount of about 10–2,000 PPM based on the weight of the composition.

22. The composition of claim 15 wherein the functionally terminal end groups are selected from the group consisting of: hydroxy, carboxy, alcohol, alkoxy, phenoxy, amine, epoxy and combinations thereof.

23. The composition of claim 15 wherein the composition comprises predominantly polyester and from about 0.5 to about 12 wt % polyolefin oligomer wherein the polyolefin oligomer has a molecular weight in the range of about 100–10,000.

24. The composition of claim 23 wherein the diameters of the polyolefin oligomer segments are predominantly less than 300 nm.

25. The composition of claim 23 wherein the polyolefin oligomer is selected from the group consisting of polypropylene, poly(4-methyl) 1-pentene, unhydrogenated polybutadiene, and mixtures thereof.

26. A packaging article comprising the composition of claim 21.

27. The packaging article of claim 26 in the form of a bottle.

28. A packaging article comprising the composition of claim 19.

29. The packaging article of claim 28 in the form of a bottle.

30. A packaging article comprising the composition of claim 23.

31. The packaging article of claim 30 in the form of a bottle.

32. A packaging article comprising the composition of claim 24.

33. The packaging article of claim 32 in the form of a bottle.

34. A composition made from a reaction of about 50 mole % of Formula I, about 50 mole % of Formula II and an amount of at least one of Formulas VI, VII or VIII effective to provide an oxygen absorbing capacity of at least 0.4 cc of oxygen per gram of composition at temperatures in the range of about 4° C. to about 60° C. wherein Formulas I, II, VI, VII and VIII are:

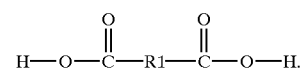

I.

wherein R1 is a divalent aromatic radical,

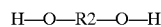

II.

wherein R2 is a divalent alkylene radical,

VI.

VII.

VIII.

wherein PBD is polybutadiene oligomer.

35. The composition of claim 34 wherein Formula I is terephthalic acid and Formula II is ethylene glycol.

36. A composition made by a process comprising the steps of:
  a) introducing into a heated mixing zone of an extruder, in any sequence, a polyester resin, up to 5,000 ppm pyromellitic dianhydride based on the weight of the composition, from about 0.5 to about 12 wt % unhydrogenated polyolefin oligomer, wherein the polyolefin oligomer is at least singly terminated with a functional end group, and about 10–2,000 ppm of cobalt based on the weight of the composition;
  b) mixing and heating the polyester, the polyolefin oligomer, pyromellitic dianhydride and cobalt under an inert atmosphere at a temperature and for a residence time in the mixing zone effective to melt the polyester and enable it to at least partially undergo a polycondensation reaction with the functionally terminated polyolefin oligomer; and
  c) cooling the mixture to provide a solid, melt processible composition having a oxygen absorbing capacity of at least 0.4 cc of oxygen per gram of composition at temperatures in the range of about 4° C. to about 60° C. and an intrinsic viscosity of at least about 0.5 deciliters/gram.

37. A packaging article comprising the composition of claim 36.

38. The packaging article of claim 37 in the form of a bottle.

39. A composition made by a process comprising the steps of:
  a) introducing into a heated mixing zone of an extruder, in any sequence, a polyester resin, up to 5,000 ppm pyromellitic dianhydride based on the weight of the composition, from about 0.5 to about 12 wt % unhydrogenated polyolefin oligomer, wherein the polyolefin oligomer is at least singly terminated with a functional end group, and about 10–2,000 ppm of cobalt based on the weight of the composition;
  b) mixing and heating the polyester, the polyolefin oligomer, pyromellitic dianhydride and cobalt at a temperature and for a residence time in the mixing zone effective to melt the polyester and enable it to at least partially undergo a polycondensation reaction with the functionally terminated polyolefin oligomer; and
  c) cooling the mixture to provide a solid, melt processible composition that when blended with a polyester resin in an amount to provide a oxygen absorbing capacity of at least 0.4 cc of oxygen per gram of composition at temperatures in the range of about 4° C. to about 60° C., can be formed into a packaging container having a transparency of greater than about 70% of that of unmodified PET.

* * * * *

UNITED STATES PATENT AND TRADEMARK OFFICE
CERTIFICATE OF CORRECTION

PATENT NO. : 6,509,436 B2  Page 1 of 1
DATED : January 21, 2003
INVENTOR(S) : Paul J. Cahill and Steven Y. Chen It is certified that error appears in the above-identified patent and that said Letters Patent is hereby corrected as shown below:

Column 7,
Line 25, the patent should show the original 3 formulas as follows:

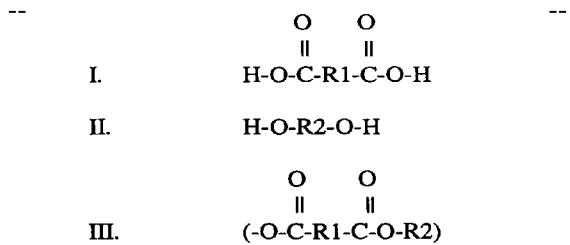

Column 12,
Lines 58-63, the patent should show the original 3 formulas as follows:

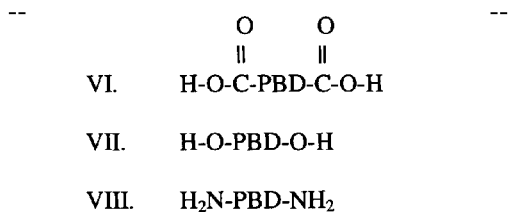

Column 16,
Line 10, should read -- temperature of about 250° - 280° C. -- not "temperature of about 2500° – 280° C."

Column 21,
Lines 15-16, should read -- packaging walls and packaging articles -- not "packaging wails and packaging articles"

Signed and Sealed this

Fifteenth Day of July, 2003

JAMES E. ROGAN
*Director of the United States Patent and Trademark Office*